(12) United States Patent  (10) Patent No.: US 7,840,525 B2
Ruby  (45) Date of Patent: Nov. 23, 2010

(54) EXTENDED TRANSACTIONS

(76) Inventor: Jonathan P. Ruby, 6 Hamilton Rd., Brookline, MA (US) 02446

( * ) Notice: Subject to any disclaimer, the term of this patent is extended or adjusted under 35 U.S.C. 154(b) by 317 days.

(21) Appl. No.: 11/870,497

(22) Filed: Oct. 11, 2007

(65) Prior Publication Data

US 2008/0092139 A1    Apr. 17, 2008

Related U.S. Application Data

(60) Provisional application No. 60/829,061, filed on Oct. 11, 2007.

(51) Int. Cl.
G06F 17/30 (2006.01)
(52) U.S. Cl. ....................................... 707/607
(58) Field of Classification Search ........................ None
See application file for complete search history.

(56) References Cited

U.S. PATENT DOCUMENTS

| 5,983,225 | A | 11/1999 | Anfindsen |
| 6,157,927 | A | 12/2000 | Schaefer |
| 6,529,932 | B1 * | 3/2003 | Dadiomov et al. .......... 718/101 |
| 6,625,601 | B1 | 9/2003 | Molloy |
| 6,671,686 | B2 | 12/2003 | Pardon |
| 6,678,696 | B1 | 1/2004 | Helland |
| 7,257,605 | B2 | 8/2007 | Murthy |
| 2005/0108255 | A1 * | 5/2005 | Alves et al. ................. 707/100 |
| 2005/0262077 | A1 * | 11/2005 | Barnes et al. ................. 707/8 |
| 2007/0073621 | A1 | 3/2007 | Dulin et al. |
| 2007/0255709 | A1 * | 11/2007 | Livshits .......................... 707/8 |

OTHER PUBLICATIONS

A Transactional Model for Long-Running Activities, by Umeshwar Dayal, Meichun Hsu and Rivka Landin, Proceedings of the 17th International Conference on Very Large Databases, Sep. 1991.*
Bernstein, Philip A., et al., "Implementing Recoverable Requests Using Queues," ACM SIGMOD Record, vol. 19, Issue 2 (Jun. 1990), pp. 112-122.
Saltzer, J.H., et al., "End-to-End Arguments in System Design," ACM Transactions in Computer Systems, vol. 2, No. 4, Nov. 1984, pp. 277-288.
Jim Gray and Andreas Reuter, Transaction Processing: Concepts and Techniques, Morgan Kaufmann Publishers, San Mateo, California, 1993, pp. 215-217.

* cited by examiner

*Primary Examiner*—Neveen Abel Jalil
*Assistant Examiner*—Kevin Young
(74) *Attorney, Agent, or Firm*—Robert Plotkin, P.C.

(57) ABSTRACT

Multiple atomic "component" database transactions are combined into a single extended transaction through message passing. The multiple component transactions that comprise a single extended transaction may, in combination, perform a single computation. The component transactions may pass messages to each other by writing and reading records to and from one or more databases. The resulting extended transaction may be distributed and/or long-lived.

22 Claims, 16 Drawing Sheets

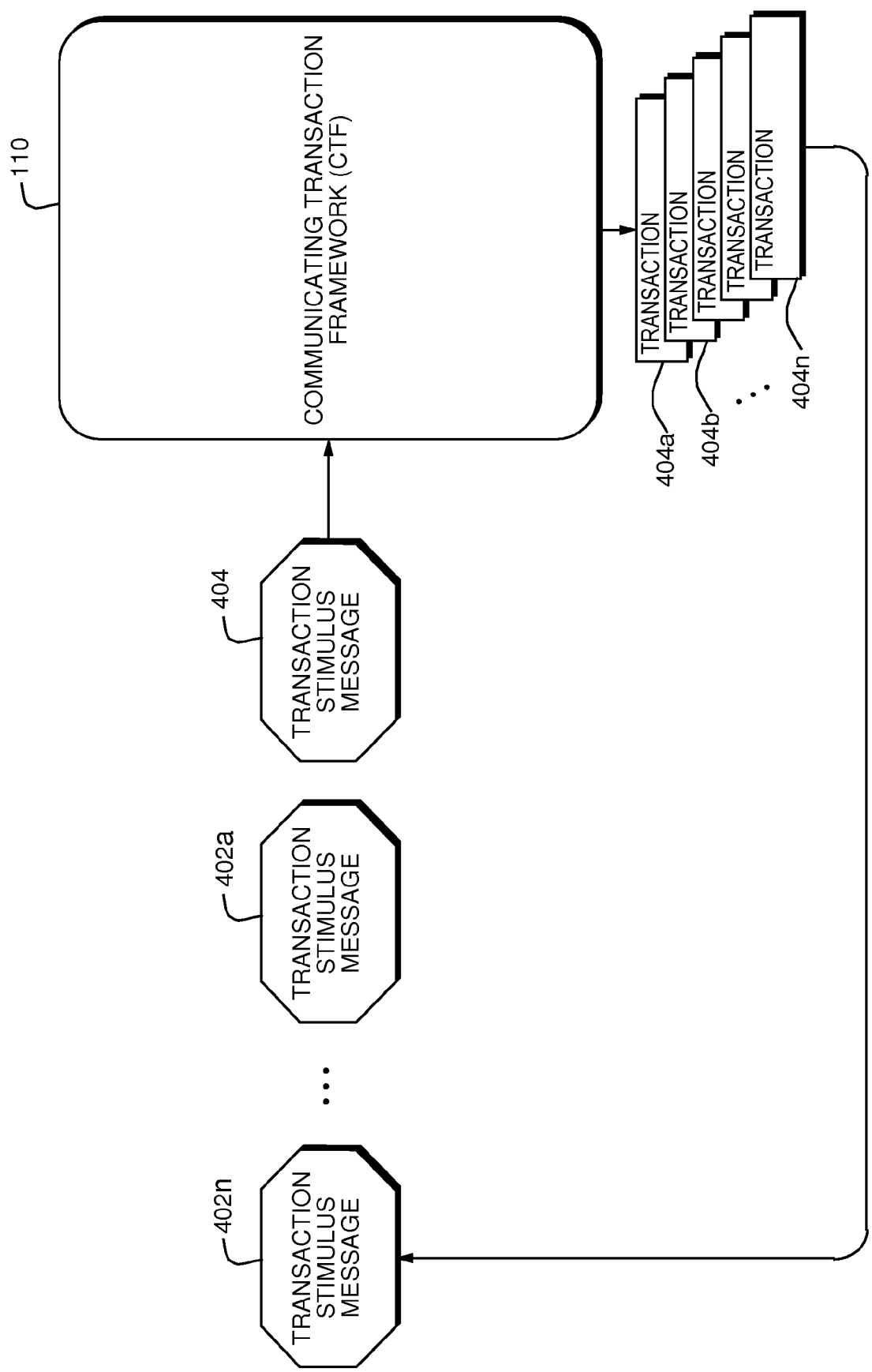

EXTENDED TRANSACTIONS

CROSS REFERENCE TO RELATED APPLICATIONS

This application claims the benefit of U.S. Prov. Pat. App. Ser. No. 60/829,061, filed on Oct. 11, 2007, entitled, "Distribute and Long Lived Transactions," which is hereby incorporated by reference.

BACKGROUND

Database systems perform "atomic transactions," such as adding records to and deleting records from a database so that either all changes take place or none. A "distributed" transaction is one that changes records in multiple databases. Current practice implements distributed transactions with a technology called the "two phase commit protocol," which implements a distributed transaction by combining multiple atomic transactions into a single computation. Each component transaction executes over a single database. One implementation of the two phase commit protocol alters the internal functioning of a distributed transaction's component transactions. Each component transaction is held open until all the component transactions are ready to finish. If all component transactions have succeeded, then all are committed. If any component transaction fails, then all roll back.

Two phase commit requires a tight linkage between the component transactions. The internal operation of each component transaction, whether it is to commit or roll back, depends on the internal operation of every other component transaction. A controller must therefore maintain a global state between the component transactions.

The tight linkage and global state of the two phase commit protocol have multiple disadvantages:

1. They complicate the implementation of the component transactions.
2. The tight integration of the component transactions requires that all of the component transactions taking part in a distributed transaction are implemented by identical software or at least by software which matches the same version of a complex standard.
3. The tight integration of the component transactions requires that all the component transactions taking part in a distributed transaction execute in the same administrative domain.
4. The extra messaging required to commit or rollback commit component transactions imposes a performance penalty.
5. The component transactions of a distributed transaction hold locks while they wait to commit or to rollback. Consequently, they can only be held open for a short time. Therefore, the communications mechanism connecting the databases on which they run must be very fast, limiting the circumstances in which it is possible to employ a two phase commit protocol.
6. The software implementing a two phase commit protocol is expensive, complicated, error prone, and difficult to install, configure and administer.

In short, use of a two phase commit protocol requires systems running the same or very similar software, tightly connected by high speed communications links, running in a single administrative domain. Two phase commit protocols, therefore, require an environment with properties that are the opposite of the properties of the environments encountered by contemporary distributed systems, particularly systems working over the World Wide Web.

SUMMARY

Embodiments of the present invention may be used to combine multiple atomic "component" transactions into a single extended transaction through message passing. The multiple component transactions that comprise a single extended transaction may, in combination, perform a single computation. The component transactions may pass messages to each other by writing and reading records to and from one or more databases. The resulting extended transaction may be distributed and/or long-lived.

Embodiments of the present invention may operate in extremely heterogeneous environments. Transactions implemented by embodiments of the present invention may, for example, execute over databases of different types and different implementations, which are connected to different types of computers running different operating systems, contained in different administrative domains, and connected by different communications mechanisms. Embodiments of the present invention, therefore, are ideally suited for use in a modern distributed environment, such as the World Wide Web.

For example, one embodiment of the present invention is a system which includes a database system. The database system includes a first database; field addressing means for addressing fields in the first database; and atomic transaction means for executing transaction instances atomically on the first database. The system also includes transaction execution means for executing a first transaction instance, wherein executing the first transaction instance comprises generating a transaction stimulus message within an atomicity guarantee of the first transaction instance, and wherein the transaction stimulus message specifies a second transaction instance. The system also includes transaction reception and execution means comprising: transaction stimulus reception means for receiving the transaction stimulus message; and transaction execution means for executing the second transaction instance in response to receiving the transaction stimulus message.

Another embodiment of the present invention is a system which includes a first transaction instance. The first transaction instance includes means sufficient for writing a message within atomicity guarantees of the first transaction instance. The message contains a field describing a state of a computation. The system also includes a second transaction instance, which includes means sufficient for reading the field describing the state of the computation; and means for performing an action in response to the state.

Other features and advantages of various aspects and embodiments of the present invention will become apparent from the following description and from the claims.

BRIEF DESCRIPTION OF THE DRAWINGS

FIG. 4 shows the Communicating Transaction Framework consuming transaction stimulus messages and executing transactions according to one embodiment of the present invention;

DETAILED DESCRIPTION

Components

Figure 1:
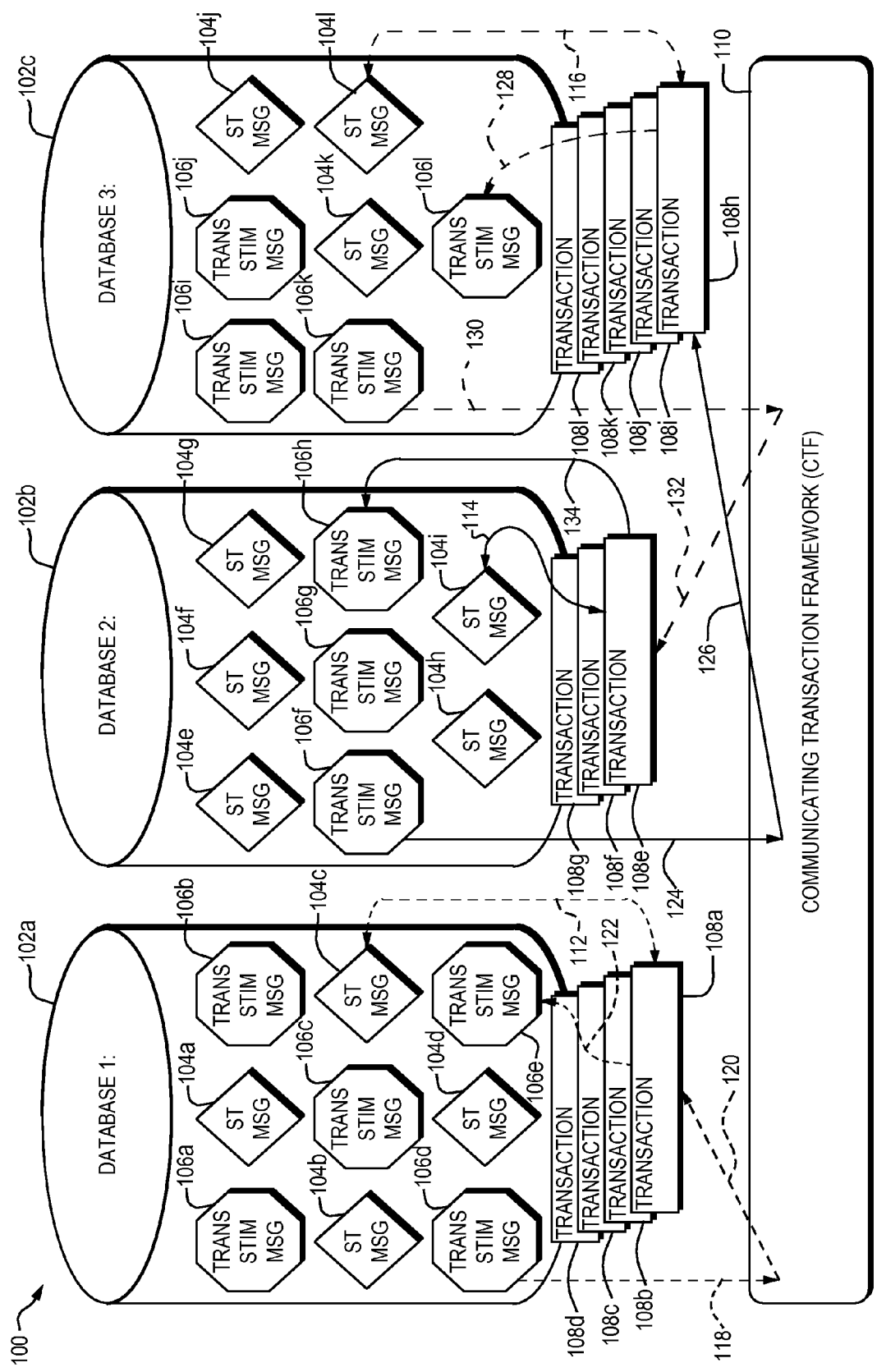
FIG. 1 shows components of one embodiment of the invention and their relations to one another.

Various embodiments of the present invention have four components: (1) databases; (2) atomic transactions; (3) messages; and (4) a program that executes transactions. One embodiment 100 of the present invention having these components is shown in FIG. 1. Although reference will be made to particular elements of FIG. 1 and other figures herein for purposes of illustration, the invention is not limited to the embodiments illustrated in the figures.

1. Databases

In general, a database is a mechanism for storing data. For purposes of the following discussion, assume that each of the databases 102a-c disclosed is able to: (1) store multiple fields of different data types; (2) address fields by name; that is, given the name of a field a program can retrieve its contents; and (3) support atomic transactions. Although certain specific kinds of databases may be described in conjunction with the embodiments disclosed herein, embodiments of the present invention are not limited to use in conjunction with the disclosed kinds of databases. Rather, those having ordinary skill in the art will appreciate how to apply the techniques disclosed herein to a variety of databases having a variety of features. For example, databases that may be used in conjunction with embodiments of the present invention include, but are not limited to, relational databases, hierarchical databases, object databases, and ISAM files.

The term "component database" is used herein to refer to a database on which a "component" (e.g., local) transaction is executed. Component transactions within a single extended (e.g., distributed) transaction performed by an embodiment of the invention may execute on component databases of different types.

2. Atomic Transactions

Assume for purposes of the remainder of the disclosure that each of the component databases 102a-c used in embodiments of the present invention includes some mechanism for implementing atomic transactions. An atomic transaction updates multiple fields in the database so that either all or none of the fields are updated. Atomic transactions may be implemented in any manner. The term "component transaction" as used herein refers to a transaction executed atomically over one or more databases. The term "local transaction" is used synonymously with "component transaction."

A transaction that is created by combining component transactions is referred to herein as an "extended transaction." A component transaction may, for example, do the kind of application-dependent work for which transactions typically are used. In one embodiment of the invention, component transactions also transmit and receive messages. A message may, for example, be an entry in the database on which a transaction acts. For example, a component transaction executed over a component database may: (1) perform an operation; (2) store results of that operation as "application data" in the component database; and (3) store a record in the database, such as a record describing the application data or a subsequent operation to be performed. This record, as will be described in more detail below, may be interpreted and used as a message.

Note that a "component transaction" may, but need not, execute over a single database. For example, suppose that a transaction executes over multiple databases and is implemented by a two phase commit protocol. Such a transaction may be a "component transaction," which may be combined with other component transactions to form an extended transaction.

3. Messages

A message is a structured unit of data which may, for example, be stored in a database. The format of a message may, for example, depend on the database in which the message is stored. For example, an embodiment of the invention which uses a relational database could represent a message as a row in a database table.

Component transactions transmit messages. A component transaction may, for example, transmit a message in the same way that it adds any data to a database over which it executes. The term "application data" refers herein to the non-message data that a transaction reads or writes. A component transaction may, for example, reads and write both messages and application data from and to the database over which the component transaction executes.

A component transaction may, for example, contain means sufficient for writing a message within atomicity guarantees of the component transaction. Similarly, a component transaction may, for example, contain means sufficient for reading a message within atomicity guarantees of the component transaction. As an example of what is meant by "means sufficient" for writing or reading a message within atomicity guarantees of the component transaction, the component transaction may be capable of writing or reading a message within atomicity guarantees of the component transaction without relying on an external "for" loop to perform such writing or reading atomically.

Recall that a component transaction may be one of multiple component transactions that, in combination, form an extended transaction. A message may, for example, describe the state of the part of an extended transaction which is available to the component transaction which created the message. The component transaction may perform an operation which performs part of the work of the extended transaction and sends one or more message to record the changes it made to the state of the extended transaction.

The reports of state changes represented by messages should be accurate; that is, a component transaction should not generate a message that reports an uncompleted action. A message's accuracy may be guaranteed, for example, by requiring that a component transaction write its messages within the same atomic transaction within which it performs its other database updates. For example, it may be required that a component transaction perform an operation, write application data resulting from that operation, and write a message reporting the contents of the application data within an atomic transaction. Atomicity guarantees that messages are transmitted if and only if the component transaction's other database updates are executed.

In various embodiments of the present invention, messages may be consumed in two ways. First, a component transaction may read a message from its database and use the message's contents as input to its computation. Such messages are referred to herein as "state messages."

Consider, for example, that the system 100 shown in FIG. 1 includes transactions 108*a-l*. Transaction 108*a* writes and reads 112 state message 104*c*, transaction 108*e* writes and reads state 114 message 104*i*, and transaction 108*h* writes and reads 116 state message 104*l*. Uses of such state messages will be described in more detail below.

Second, a message may be a transaction stimulus. For example, the system 100 shown in FIG. 1 includes transaction stimulus messages 106*a-l*. In general, a transaction stimulus message causes an atomic transaction to be executed over one or more databases. Contents of the transaction stimulus message may, for example, specify, explicitly or implicitly: (1) the type of the component transaction to execute (e.g., the transaction script to run); (2) the database over which the execute the component transaction; and (3) the arguments to pass to the component transaction when it executes. For example, in one embodiment of the present invention, a computer program referred to herein as a "Communicating Transaction Framework" (CTF) 110 may be connected to a database. The CTF 110 may read a transaction stimulus message and cause the transaction described by the message to be executed over a database, which may or may not be the same database as that to which the CTF is connected. The CTF may, for example, provide the transaction stimulus message to another program, which may execute the transaction described by the message.

A transaction stimulus message may be generated in any of a variety of ways. For example, a component transaction may execute and, as a result, generate a transaction stimulus message. The CTF 110 may read such a message and, in response, cause the transaction described by the transaction stimulus message to be executed, either on the same database as that over which the originating component transaction executed, or on another database or databases.

For example, as shown in FIG. 1, CTF 110 may read 118 transaction stimulus message 106*d* from database 102*a* and cause the transaction 108*a* described by the message 106*d* to be executed over database 102*a*. When transaction 108*a* executes, it may write transaction stimulus message 106*e* in database 102*a* and write 112 state message 104*c* in database 102*a*. As another example, CTF 110 may read 124 transaction stimulus message 106*f* from database 102*b* and cause the transaction 108*h* described by the message 106*f* to be executed over database 102*c*. When transaction 108*h* executes, it may write 128 transaction stimulus message 106*l* in database 102*c* and write 116 state message 104*l* in database 102*c*. As yet another example, CTF 110 may read 130 transaction stimulus message 106*k* from database 102*c* and cause the transaction 108*e* described by the message 106*k* to be executed over database 102*b*. When transaction 108*e* executes, it may write 134 transaction stimulus message 106*h* to database 102*b* and write 114 state message 104*i* to database 102*b*.

Transmission and reception of messages binds component transactions that transmit and receive those messages into a single extended transaction. When one component transaction receives a message produced by another component transaction, the two component transactions become part of a single extended transaction. When a component transaction transmits a transaction stimulus message and causes the execution of a second component transaction, the two component transactions become part of the same extended transaction.

The distinction between the two message types (state and transaction stimulus) need not be absolute. For example, a component transaction may read a transaction stimulus message and treat it as a state message. As another example, a transaction stimulus message may contain data which is passed to the transaction it invokes; in this case, the invoked transaction reads input values from the transaction stimulus message.

Programs other than transactions or the Communicating Transaction Framework may read messages. Any program which can connect to a database may read messages contained in that database and may write new messages.

4. A Program that Executes Transactions

As described above, the term "communicating transaction framework" (CTF) refers to a program which executes component transactions. The CTF 110 may, for example, be distributed. For example, the CTF 110 may be connected to or otherwise distributed over multiple databases. The CTF 110 may, for example, be distributed over all of the component databases involved in a particular extended transaction. The CTF 110 may receive transaction stimulus messages and execute the transactions described by each message.

A single component transaction may transmit one or more state messages, one or more transaction stimulus messages, or any combination of both. Writing a state message to a database, for example, makes the message available for reception. Writing a transaction stimulus message, however, may, in itself, not be enough to cause the described transaction to be executed. The purpose of a transaction stimulus message is to cause the execution of a transaction over a given database; simply transmitting a transaction stimulus message may not, however cause the transaction it describes to be executed.

The CTF 110 may be used to fill the gap between the transmission of a transaction stimulus message and the execution of the transaction described by that message. The CTF 110 may, for example, receive each transmitted transaction stimulus message and transfer it to a transaction execution component of the CTF 110 connected to the database over which the described transaction should execute. The transaction execution component may then execute the described transaction over that database. The CTF 110 may receive all transmitted transaction stimulus messages and process them in this way. Different CTFs may be connected to different databases, in which case each CTF may receive and process transactions stimulus messages transmitted by the database to which it is connected.

Figure 2A:
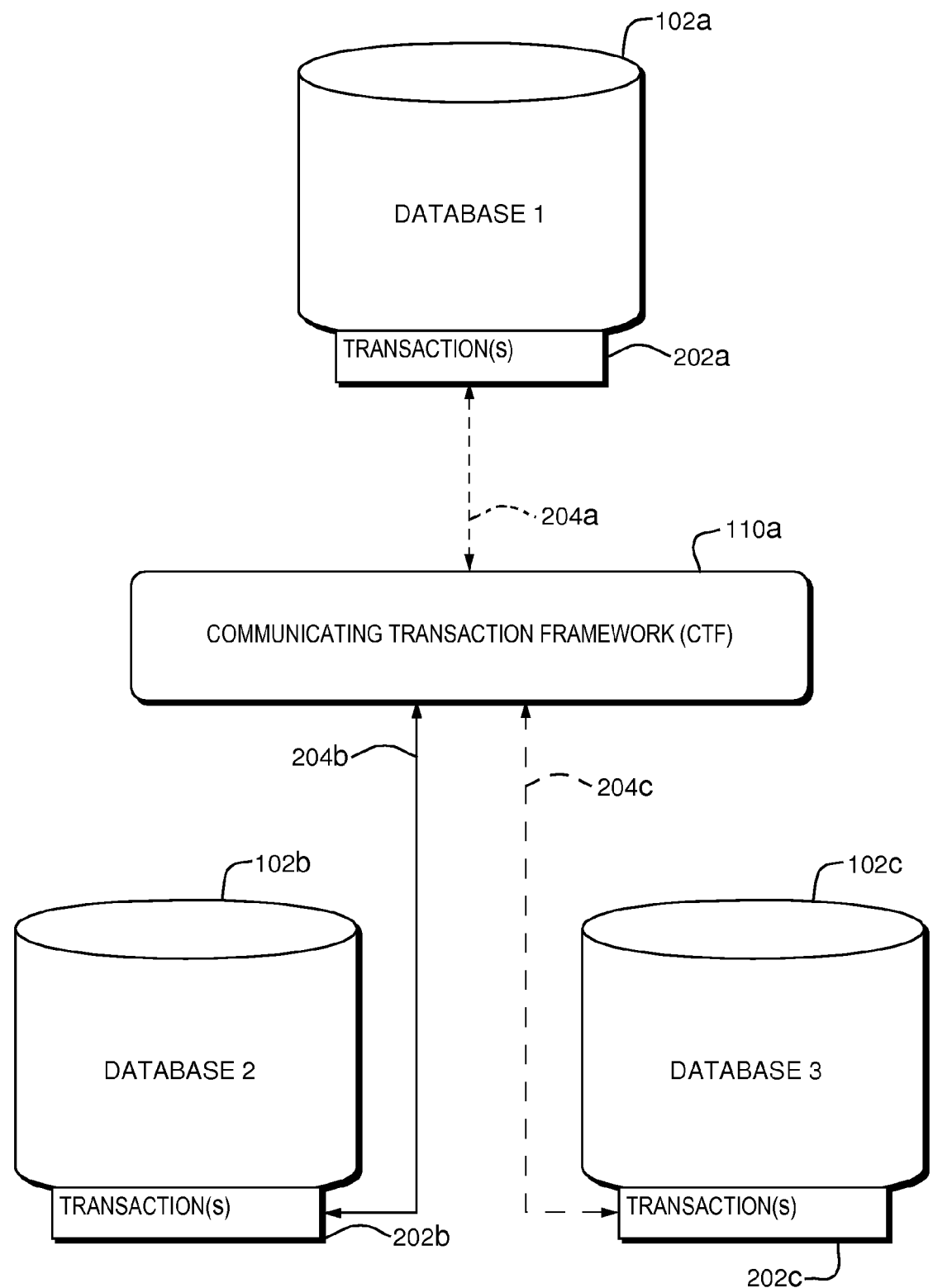
FIGS. 2A and 2B show a non-distributed and distributed Communicating Transaction Framework implemented according to one embodiment of the present invention.

The CTF 110 may, for example, be implemented as a single process, multithreaded or not. For example, referring to FIG. 2A, an embodiment of a single-process CTF 110*a* attached to multiple databases 102*a-c* is shown. In this embodiment, the CTF 110*a* receives all transmitted transaction stimulus messages from the databases 102*a-c* on connections 204*a-c*, respectively, and executes the transactions 202*a-c* described by the receives transaction stimulus messages on the appropriate ones of the databases 102*a-c*.

Figure 2B:
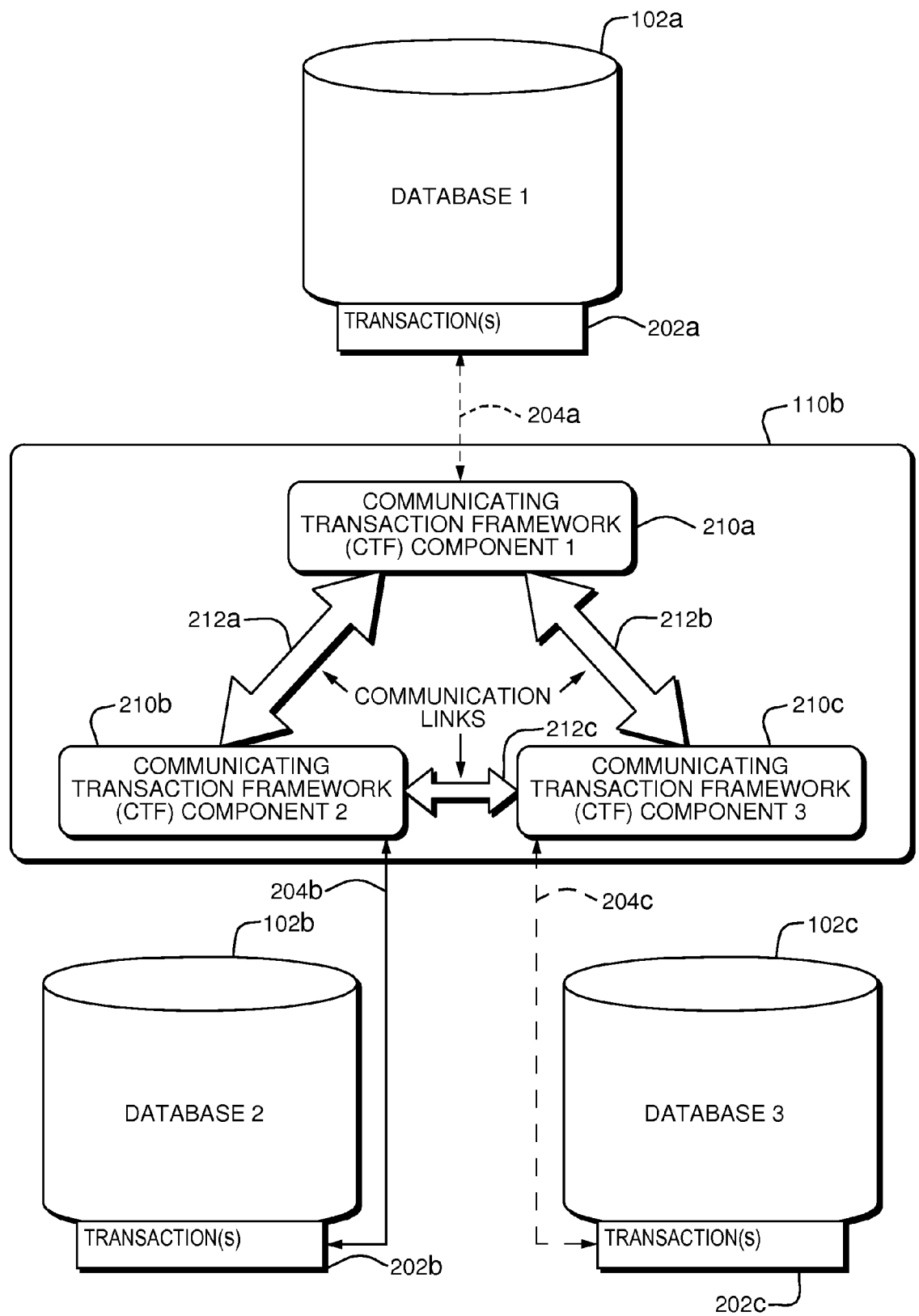

As shown in FIG. 2B, the CTF 110 may alternatively, for example, be implemented as a distributed program 10*b* in which different processes 210*a-c* are attached to different databases 102*a-c*, respectively. The component processes 210*a-c* may or may not be multithreaded.

In the embodiment shown in FIG. 2B, a communications mechanism (such as communications links 212a-c) may be used to carry transaction stimulus messages from one component of the CTF 110b to another. The communications mechanism may be any data transfer mechanism which can carry a message. A message may, for example, be a string of bytes. Examples of communications mechanisms include those for communicating according to TCP, HTTP, or any email protocol. As another example of a communications mechanism, a transaction stimulus message may be stored on a removable storage medium (such as a floppy diskette or a CD), which may be physically transported from one computer to another. In general, the communication mechanism only needs to guarantee the successful transfer of a message after a finite number of attempts. The communications mechanism does not need to guarantee at most once delivery. A failure of the communications mechanism may be treated as a failure of the CTF 110b and may be handled by retries and operator intervention.

OPERATION OF EMBODIMENTS OF THE INVENTION

One function performed by embodiments of the present invention is to execute a distributed and/or long-lived transaction as a message-based computation. A message-based computation may include two kinds of components: actors and messages. Actors are computations which produce and consume messages. Messages are structured units of information exchanged between actors. The actors exchange messages to coordinate their individual executions into a single computation. Actors may be implemented in embodiments of the present invention as atomic transactions executed over databases, and messages may be implemented as entries in those databases.

A set of atomic transactions executed over databases may be combined into a single extended transaction for performing a single computation through the exchange of messages, such as by: (1) transmitting messages by entering each message into a database operated on by at least one of the transactions in the set of atomic transactions; (2) transmitting messages by an atomic transaction within atomicity guarantees of the atomic transaction; (3) receiving messages by a transaction by reading them from one or more databases; (4) altering the behavior of a receiving transaction on the basis of received messages' content; and (5) creating new transactions belonging to the extended transaction's set of atomic transactions by executing those messages identified as transaction stimuli.

A component transaction may transmit a message by writing it into a database over which the component transaction executes. The component transaction may write a message in the same way it writes any other data to a database. Similarly, a component transaction may receive a message by reading it from a database in the same way the transaction reads any other data from that database.

A component transaction may read a message and use the message's contents in its own computation. The receiving transaction may, for example, use the message contents as parameters for calculation and/or to determine its execution path. In either case, the receiving transaction becomes part of the same computation as the transmitting transaction.

Figure 3:
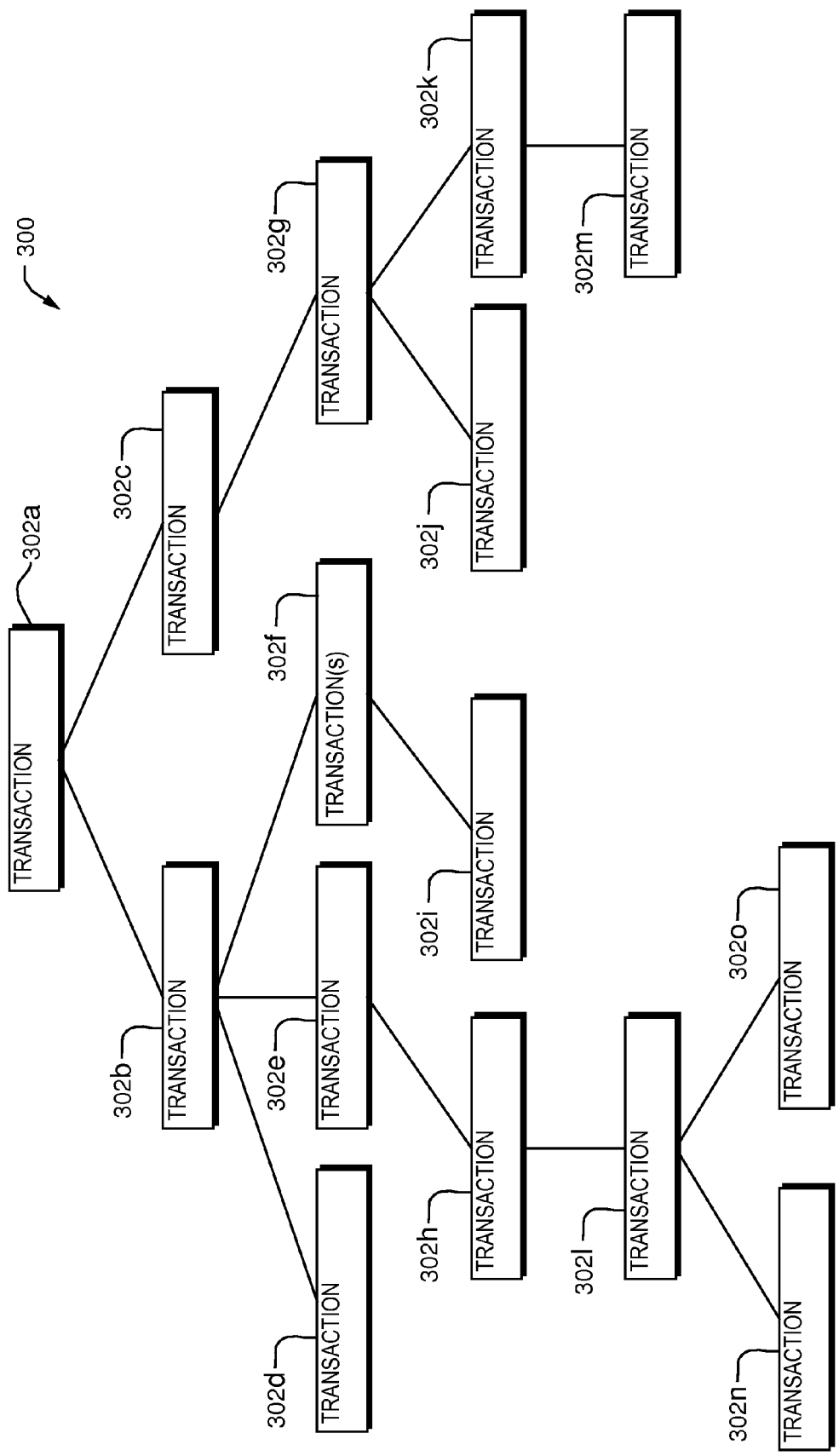
FIG. 3 shows a tree of transactions according to one embodiment of the present invention.

Embodiments of the invention may execute a distributed or long-lived transaction as a set of component transaction executions. The set of component transaction executions takes the form of one or more trees of component transaction executions. Referring to FIG. 3, a representation of a transaction tree 300, including transactions 302a-o, is shown according to one embodiment of the present invention. The root of each tree (such as the root 302a of tree 300) may be a component transaction which was not invoked by a transaction stimulus created by a component transaction. The execution of a distributed or long-lived transaction may include multiple trees of component transactions, such as in the case of a long-lived transaction whose execution might pause until it is restarted by another root component transaction.

A root component transaction creates child component transactions by transmitting transaction stimuli messages. For example, root transaction 302a in FIG. 3 creates child component transactions 302b and 302c by transmitting transaction stimuli messages (not shown in FIG. 3). These transaction stimuli messages invoke component transactions which create children of their own (e.g., transactions 302d-g) by transmitting transaction stimuli messages. The tree of component transactions grows until all the executing child nodes fail to transmit new transaction stimuli messages.

It may be necessary to prevent two component transactions belonging to the same extended transaction from executing on the same database simultaneously. Otherwise, race conditions could leave the messages in a confused state.

As described above, the Communicating Transaction Framework 110 and the data communications mechanisms it uses turn transaction stimulus messages into component transactions. Referring to FIG. 4, a flowchart is shown of an embodiment of the invention which runs as a loop in which transaction stimulus messages 402a-n are consumed by the CTF 110, which executes them as component transactions which produce transaction stimulus messages which are consumed by the CTF 110 and so on. Transaction stimulus message 404 in FIG. 4 is the transaction stimulus message 404 being processed by the CTF 110 in the current iteration of the loop over messages 402a-n.

The loop mentioned above may be multithreaded in that the CTF 110 may execute multiple transactions simultaneously. The CTF 110 may execute multiple transactions simultaneously over each individual database and it may execute multiple transactions over multiple databases simultaneously.

The CTF 110 may or may not guarantee at least once execution. The CTF 110 may, for example, guarantee repeated attempts at the execution of each transmitted transaction stimulus message. The number of attempts to execute a given transaction stimulus and the delay between attempts may be user-configurable.

No locks need be held while the CTF 110 retries a transaction stimulus's execution. A failure to execute a transaction stimulus need not block the execution of any other transaction. An arbitrary length of time may pass between the transmission of a transaction stimulus message and its execution without invalidating the correctness of the distributed transaction of which the component transaction is a part and without interfering with the execution of any other transaction. There is no intrinsic limit on the number of retry attempts for a given transaction stimulus.

Figure 10:
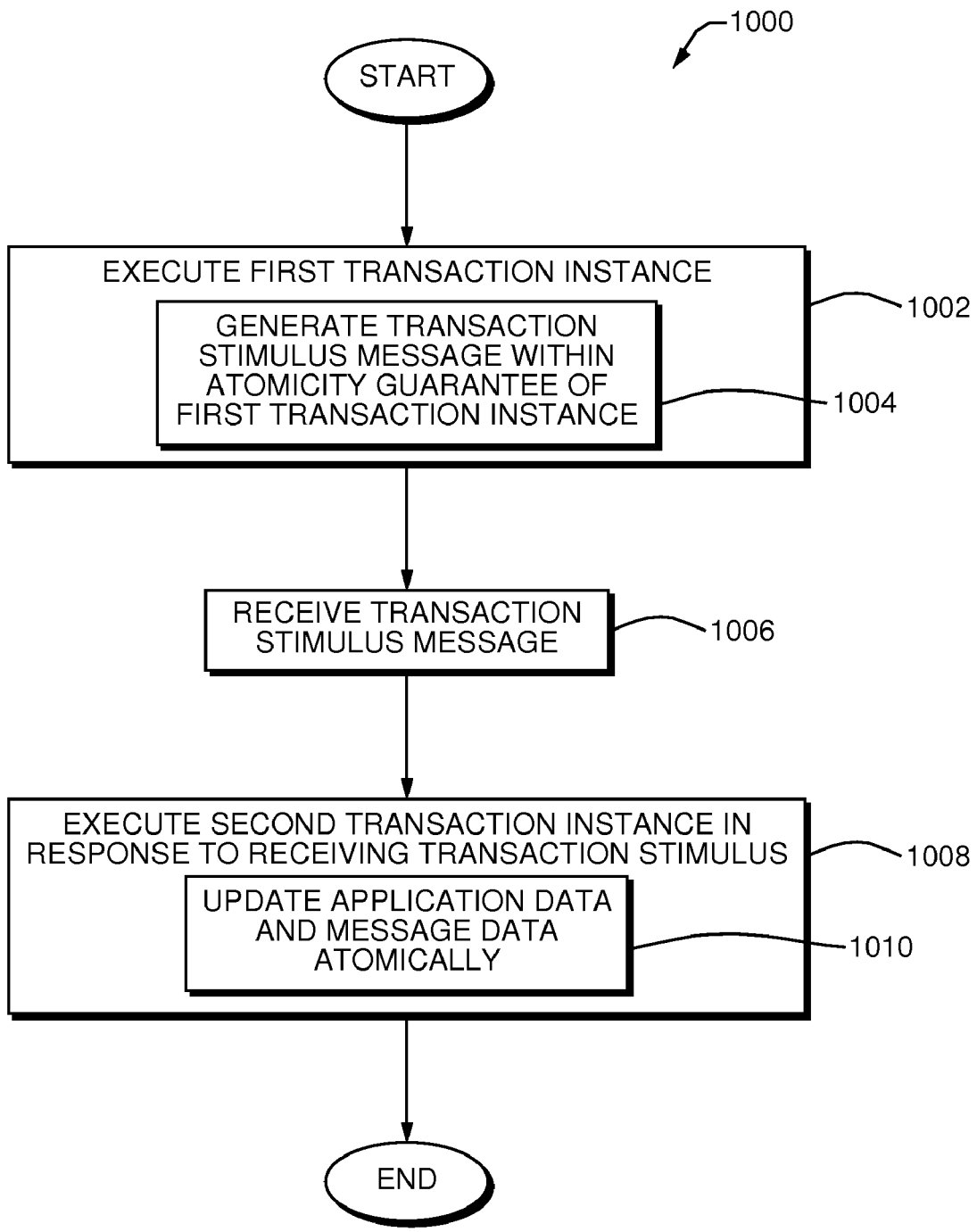
FIG. 10 is a flowchart of a method performed by one embodiment of the present invention to perform an extended transaction using two component transactions.
Figure 11:
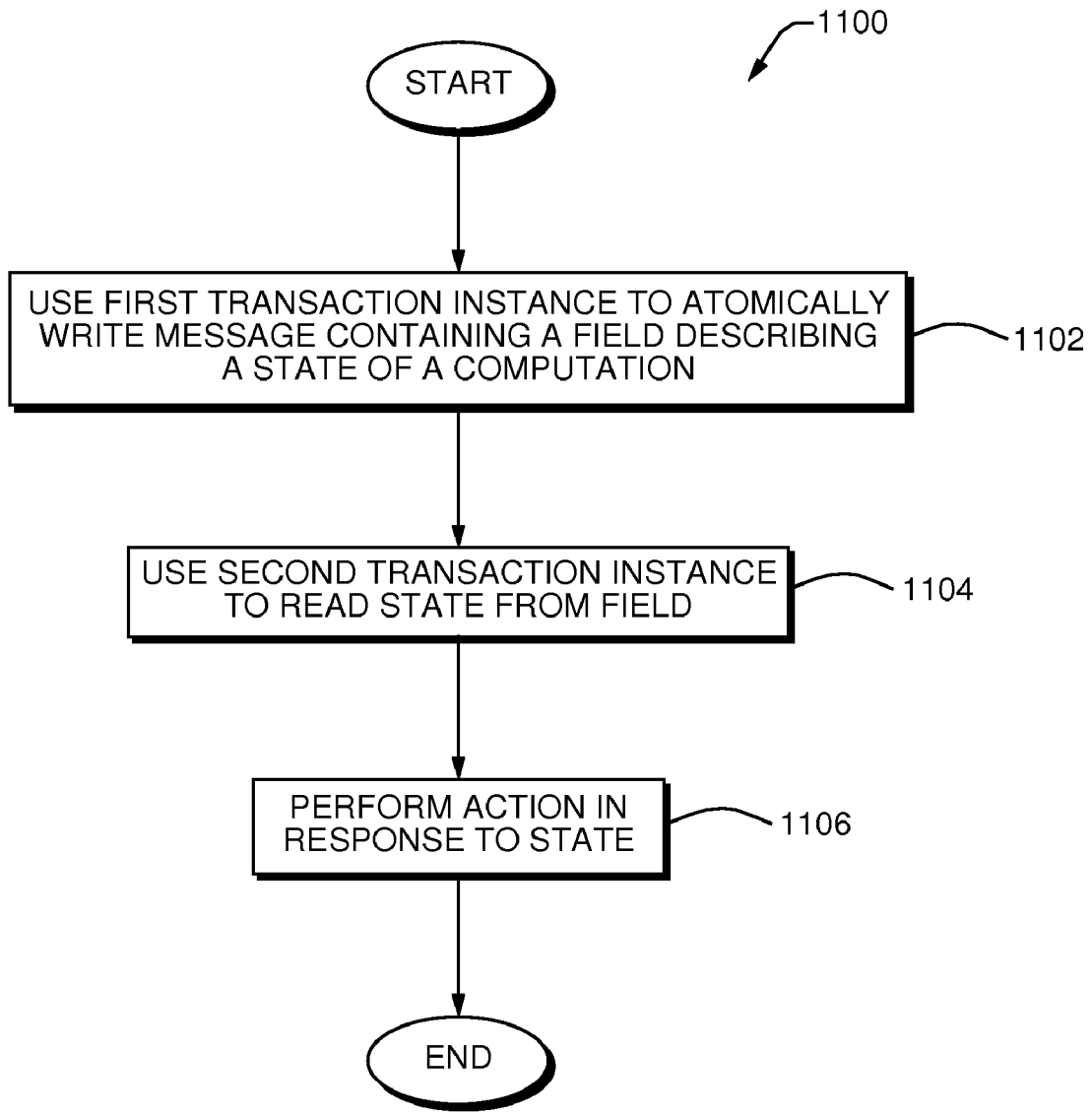
FIG. 11 is a flowchart of another method performed by one embodiment of the present invention to perform an extended transaction using two component transactions.

Examples of two methods that may be performed by embodiments of the present invention are illustrated in FIGS. 10 and 11. In particular, FIG. 10 shows a flowchart of a method 1000 for performing an extended transaction using two component transactions according to one embodiment of the present invention. The method 1000 executes a first transaction instance (step 1000). The first transaction instance may generate a transaction stimulus message within an atomicity guarantee of the first transaction instance (step 1002). The method 1000 receives the transaction stimulus message that was generated in step 1004 (step 1006). In response to receipt of the transaction stimulus message, the method 1000 executes a second transaction instance (step 1008). Executing the second transaction instance may include updating application data and message data atomically (step 1010).

Referring to FIG. 11, a flowchart is shown of another method 1100 for performing an extended transaction using two component transactions according to another embodiment of the present invention. The method 1100 uses a first transaction instance, which includes means sufficient for writing a message within atomicity guarantees of the first transaction instance, to write such a message within the atomicity guarantees of the first transaction instance (step 1102). The message contains a field describing a state of a computation. The method 1100 uses a second transaction, which includes means sufficient for reading the field describing the state of the transaction, to read that field (step 1104) and to perform an action in response to the state stored in the field (step 1106).

EXAMPLES

Examples will now be provided of ways in which distributed and long-lived transactions may be implemented as computations created by the exchange of messages between atomic transactions.

Reliable Queues

Figure 5A:
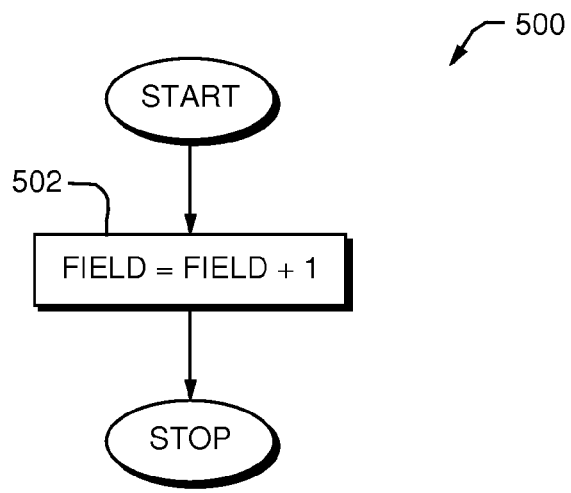
FIGS. 5A and 5B are flowcharts of programs involved in a "reliable queue" example disclosed herein in conjunction with one embodiment of the present invention.

In one embodiment of the present invention, extended transactions may be used to implement reliable queues. A system implemented according to this embodiment may include:

(1) a database D
(2) a field name 'Field' contained in the database D. Field contains an integer value. Field's value may be programmatically read and written.
(3) a computer program P which increments the value of Field in place (see method 500 in FIG. 5A, consisting of step 502).
(4) a byte string TS
(5) a communications mechanism CM which carries byte strings
(6) a computer program called the CTF which:
  a. can execute the computer program P over the database D
  b. executes P over D as an atomic transaction
  c. increases the value of Field by one when it executes P over D
  d. receives byte strings transmitted over CM
  e. on receipt of the byte string TS, executes P over D as an atomic transaction Suppose we want to increase the value of Field by one. One way to do this would be to create an instance of the byte string TS and transmit it to the CTF over CM. The CTF will receive TS, execute P, and increase the value of Field by one.

This solution is simple but fallible. There are two types of possible failures, negative failures and positive failures. A negative failure occurs when P fails to execute and the value of Field remains unchanged. A positive failure occurs when P executes more than once and the value of Field increases by more than one. Negative failures may be avoided with a retry mechanism. Positive failures are more difficult to avoid. Positive failures can be caused by the retry mechanism used to avoid negative failures.

Contemporary practice avoids both positive and negative failures with a single mechanism: a reliable queue. A reliable queue includes a retry mechanism to handle negative errors. A reliable queue avoids positive errors by wrapping the creation of TS, the delivery of TS over CM, and the execution of P by CTF into a single distributed transaction, using a two phase commit protocol.

In one embodiment of the present invention, negative failures may be avoided with any appropriate retry mechanism and positive failures may be avoided as follows. The following embodiment avoids the use of a two phase commit protocol, with the resulting advantages mentioned above.

Figure 5B:
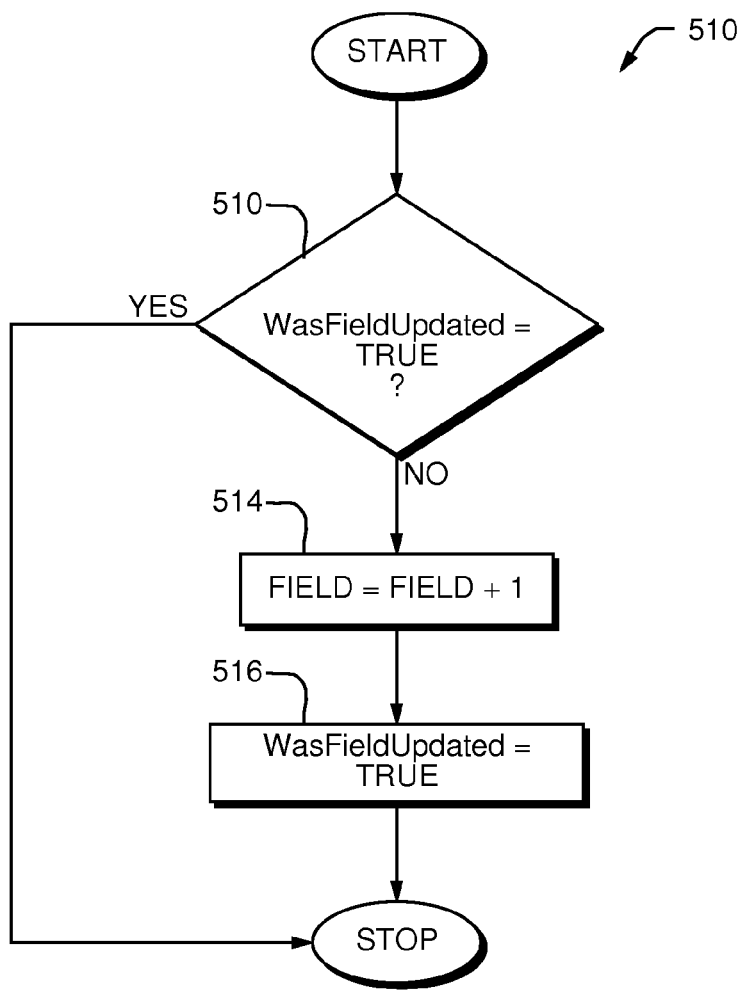

In the present embodiment, positive errors may be avoided by making the execution of P idempotent. More specifically, P and D may be changed so that multiple executions of P are equivalent to a single execution. This may be achieved by, for example:

(1) adding a new field named 'WasFieldUpdated' to D. This field holds a boolean value, initialized to false. WasFieldUpdated is a state message.
(2) changing P to program named PP (see method 510 in FIG. 5B), which determines whether WasFieldUpdated is false (step 512), and which increments the value of Field in place (step 514) and assigns the value of true to WasFieldUpdated (step 516) if WasFieldUpdated is false.
(3) changing the CTF to invoke PP as an atomic transaction over D on receipt of TS As a result, PP reads and writes the state message WasFieldUpdated. WasFieldUpdated is a state message exchanged between instances of PP. PP does not create a transaction stimulus message.

The first execution of PP increments Field and sets WasFieldUpdated to true. Any subsequent execution of PP will have no effect. PP, therefore, is idempotent.

If PP is invoked more than once, it will only increment Field once. Another possibility is that PP fails while executing. If PP fails before setting WasFieldUpdated to true and incrementing Field, the failure is a negative error like any other and may be handled as such. If PP sets WasFieldUpdated to true but fails before incrementing Field, then transaction semantics will roll back the update of WasFieldUpdated, WasFieldUpdated will be false, and Field will be unchanged so that the failure is simply a negative error and may be handled as such. If the transaction fails after the values of both WasFieldUpdated and Field are changed, then transaction semantics will reset both fields to their original values and the failure will appear as a negative error. Negative errors may be handled by a retry mechanism.

A Distributed Transaction

In one embodiment of the present invention, extended transactions may be used to implement a distributed transaction. A system implemented according to this embodiment may include:

(1) a database D1
(2) a field named 'Field1' contained in the database D1. Field1 contains an integer value. Field1's value can be programmatically read and written.
(3) a computer program P1 which is as follows:
  if (Field1>0) then
    Field1:=Field1−1
  end
(4) a byte string TS1
(5) a database D2
(6) a field named 'Field2' contained in the database D2. Field2 contains an integer value. Field2's value can be programmatically read and written.
(7) a computer program P2 which is as follows:
  if (Field2>0) then
    Field2:=Field2−1
  end (8) a byte string TS2

(9) a communications mechanism CM which carries byte strings

(10) a distributed computer program with two components:
  a. CTF1 which
    1. can execute the computer program P1 over the database D1
    2. executes P1 as an atomic transaction
    3. when it executes P1, the value of Field1 is decreased by 1 if and only if the original value of Field1 was zero or more
    4. receives byte strings from CM
    5. transmits byte strings over CM
    6. on receipt of the byte string TS1 over CM, executes P1 over D1 as an atomic transaction
  b. CTF2 which
    1. can execute the computer program P2 over the database D2
    2. executes P2 as an atomic transaction
    3. when it executes P2, the value of Field2 is decreased by one if and only if the original value of Field2 was zero or more
    4. receives bytes strings transmitted over CM
    5. transmits byte strings over CM
    6. on receipt of the byte string TS2 over CM, executes P2 over D2 as an atomic transaction We want to guarantee that Field2 is decremented if and only if Field1 is decremented. This guarantee may be implemented by, for example, using extended transactions implemented according to the present invention and a technique called "compensating transactions." More specifically, this guarantee may be implemented by adding the following fields to D1:

(1) StateOfField1, for storing a state message. This field may be initialized to contain an integer value of 1.

(2) TransactionStimulusField1, for storing a transaction stimulus message. This field may be initialized to contain a null byte string.

Furthermore, the following fields may be added to D2:

(1) WasField2Updated, for storing a state message. This field may be initialized to contain a Boolean false value.

(2) TransactionStimulusField2, for containing a transaction stimulus message. This field may be initialized to contain a null byte string.

Furthermore, a new byte string, TSC, may be created.

The messages TS1, TS2, and TSC may have any contents. The only requirement is that CTF1 and CTF2 can identify the messages.

Figure 6A:
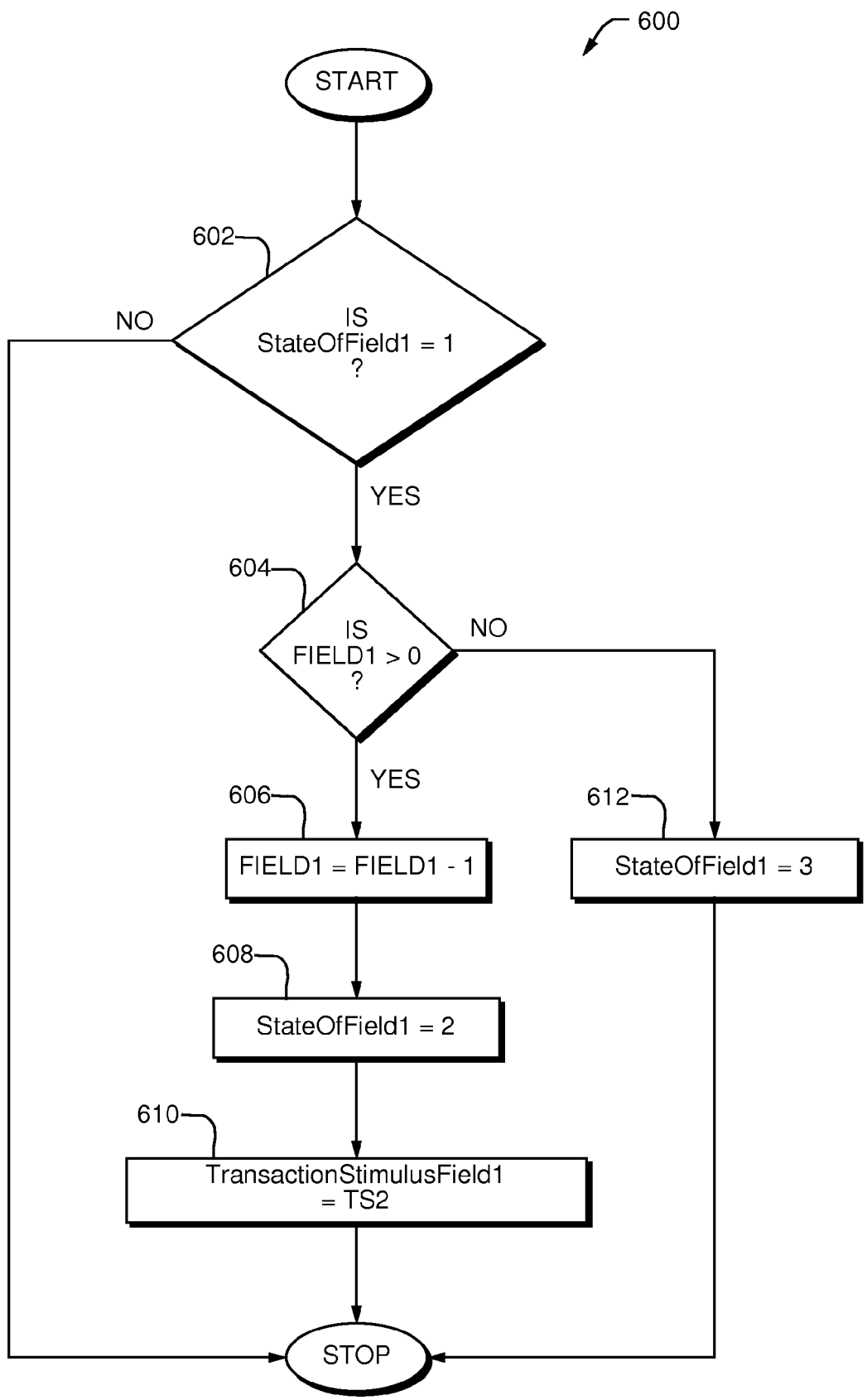
FIGS. 6A, 6B, and 6C are flowcharts of the programs involved in a "distributed transaction" example disclosed herein in conjunction with one embodiment of the present invention.

P1 may be changed to PP1, as shown in the method 600 of FIG. 6A. In particular, if StateOfField1 is equal to one (step 602) and Field1 is greater than zero (step 604), then Field1 is decremented in place (step 606), StateOfField1 is assigned a value of two (step 608), and TransactionStimulusField1 is assigned the value of TS2 (step 610). If StateOfField1 is equal to one (step 602) but Field1 is not greater than zero (step 604) then StateOfField1 is assigned a value of three (step 612).

PP1 may read and writes the state message StateOfField1. Furthermore, PP1 may write the transaction stimulus message TS2 to the database field TransactionStimulusField1. TS2 will cause the execution of PP2 over D2. PP1 is idempotent due to the use of the state message StateOfField1.

A new program, named PC1, may be added. CTF1 may execute PC1 as an atomic transaction over D1. PC1 may be as shown by the method 640 of FIG. 6C. In particular, if StateOfField1 is equal to two (step 642), the Field1 is incremented in place (step 644) and StateOfField1 is assigned a value of three (step 646).

PC1 may read and write the state message StateOfField1. The transaction stimulus message TSC may initiate PC1. PC1 is a compensating transaction for PP1. The state message StateOfField1 is used to make PC1 idempotent.

Figure 6B:
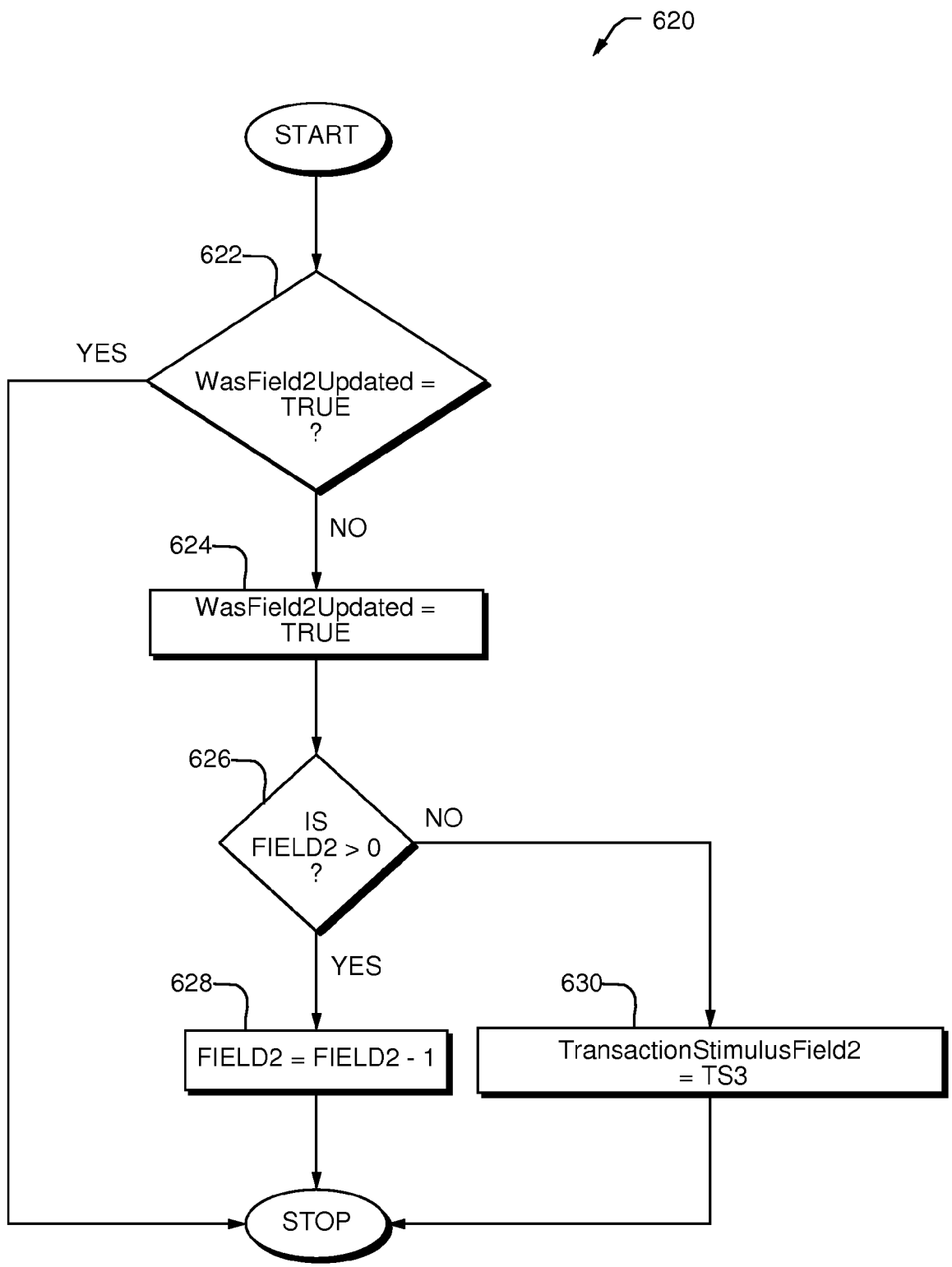
Figure 6C:
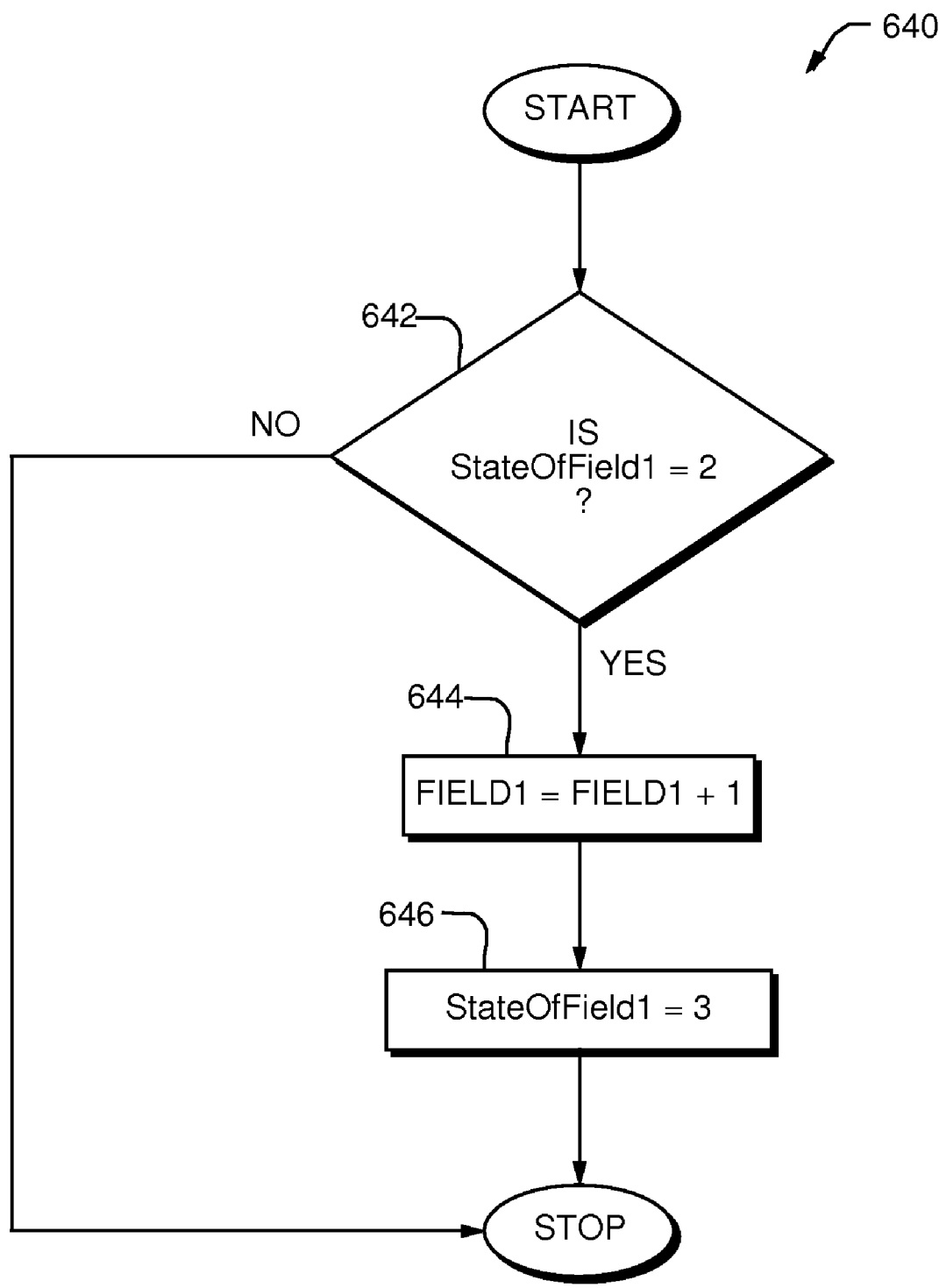

P2 may be changed to PP2, as shown by the method 620 of FIG. 6B. In particular, if WasField2Updated is false (step 622), then WasField2Updated is assigned a value of true (step 624) and it is determined whether Field2 is greater than zero (step 626). If Field2 is greater than zero, then Field2 is decremented in place (step 628). If Field2 is less than or equal to zero, then TransactionStimulusField2 is assigned the value of TS3 (step 630).

PP2 may read and write the state message 'WasField2Updated'. Furthermore, PP2 may write the transaction stimulus message TSC to TransactionStimulusField2. TSC may cause the execution of PC1 over D1. The transaction stimulus message TS2 may invoke the execution of PP2. PP2 is made idempotent through the use of the state message WasField2Updated.

Furthermore, CTF1 may be changed so that:

(1) on receipt of TS1, CTF1 executes PP1 as an atomic transaction over D1

(2) on receipt of TSC CTF1 executes PC1 as an atomic transaction over D1

(3) if TransactionStimulusField1 contains a non-null value, CTF1 will read that value and transmit it to CTF2 over CM CTF2 may be changed so that:

(1) on receipt of TS2, CTF2 executes PP2 as an atomic transaction over D2

(2) if TransactionStimulusField2 contains a non-null value, CTF2 reads that value and transmits it to CTF1 over CM Now sending TS1 to CTF1 over CM will decrement Field1 and Field2 atomically.

This scheme uses the technique previously described to avoid positive errors. Instances of PP1, PP2, and PC1 exchange state messages StateOfField1 and WasField2Updated, which make their execution idempotent. PP1 is idempotent because it decrements Field1 only if StateOfField1 equals 1, and StateOfField1 equals 1 only if Field1 has not been decremented. PC1 is idempotent because it increments Field1 only if StateOfField1 equals 2, and StateOfField1 equals 2 only if Field1 has been decremented but has not been incremented. PP2 is idempotent because it decrements Field2 only if WasField2Updated is false, and WasField2Updated is false only if Field2 has not been decremented. As before, negative errors may be handled by a retry mechanism, perhaps included in CTF1 and CTF2.

Consider the behavior of the system in all possible cases after transmitting TS to CTF1 over CM. In all cases, CTF1 executes PP1. Then:

If Field1<=0 then PP1 does not decrement Field1 and PP2 is never executed. Therefore, neither Field1 nor Field2 is decremented.

If Field1>0 and Field2>0, then PP1 decrements Field1 and sets TransactionStimulusField1 to TS1. Then CTF1 transmits TS1 to CTF2 over CM. CTF2 executes PP2, which decrements Field2. Both Field1 and Field2 are decremented.

If Field1>0 and Field2<=0, then PP1 decrements Field1 and sets TransactionStimulusField1 to TS1. Then CT1 transmits TS1 to CTF2 over CM. CTF2 executes PP2, which does not decrement Field2 but sets TransactionStimulusField2 to BS2. CTF2 transmits TS2 to CT1, which executes PC1 and Field1 is incremented, reversing the effect of PP1. Neither Field1 nor Field2 change. In this case, PC1 acts as a "compensating transaction."

As before, a failure in a component transaction rolls back all the transaction's updates to the database and the failed transaction appears as a negative error. Negative errors are handled by a retry mechanism. Note that CTF1 and CTF2 combined with CM form the Communicating Transaction Framework for this example.

Multiple Transactions

In the previous examples, each extended transaction is executed only once. Embodiments of the present may, however, execute multiple instances of an extended transaction, such as if the following assumptions hold:

(1) Fields in the databases are keyed; each database field is identified by a field name and a key. Given that name and key, the corresponding field may be read and updated. For example, in a relational database, a field's name is the table name and column name while its key is the row's primary key.

(2) Each extended transaction instance is identified by a unique ID and all transaction stimuli for that extended transaction instance contain that ID.

(3) Each component transaction retrieves the extended transaction ID from the transaction stimulus which caused its execution, and uses that ID as a database key identifying the database fields it uses as messages Then, each extended transaction instance has its own message fields in its databases. As a result, multiple instances of an extended transaction may execute simultaneously or serially.

Ordering Transaction Execution

Component transactions transmit and receive messages. The CTF receives transaction stimulus messages. Other programs may transmit and receive messages. As an example, consider a case in which the CTF receives state messages. Suppose that:

(1) a transaction produces two messages, M1 and M2
(2) M1 and M2 are transaction stimuli
(3) M1 and M2 are to be executed over the same database A guarantee that M2 is executed if and only if M1 has successfully executed may be fulfilled as follows:

(1) change M1 and M2:
  a. assign a unique ID to the message M1 and include the ID within M1
  b. include the ID of message M1 within message M2
(2) add a field LF to the database, initialized to null
(3) change the transaction initiated by M1:
  a. the transaction retrieves the message ID from the transaction stimulus message which caused its execution
  b. the transaction transmits a state message by writing its message ID to LF
(4) change the CTF so that:
  a. on receipt of M2, the CTF extracts the ID of M1 from M2
  b. the CTF reads state message LF
  c. the CTF executes M2 if and only if the value of LF equals the ID of M1

M2 executes after M1 has executed successfully because LF contains M1's ID. Suppose the CTF receives M2 before M1 has successfully executed. Then LF is null and the CFT discards M2. Suppose the CTF subsequently receives M1 and successfully executes it. Then the failure to execute M2 is a negative error and a retry mechanism will resend M2. LF will contain M1's message ID and the CTF will receive and execute M2.

A SAMPLE EMBODIMENT OF THE INVENTION

Databases

An sample embodiment of the present invention will now be described. The sample embodiment includes one or more databases, each of which may be any conventional relational database of any type. As a result, different databases in the sample embodiment may be of different types. Each such database may, for example, be a proprietary database, such as an Oracle database, or an open source database, such as MySQL. A database included in the sample embodiment must meet two requirements:

(1) the database must support atomic transactions; and
(2) it must be possible to connect to the database with JDBC (JAVA Database Connectivity).

In the sample embodiment, each database is assigned a different integer, called a "database ID," as an identifier. Every transaction stimulus message contains the database ID of the database on which the transaction stimulus message's transaction should execute.

Computers

The sample embodiment runs on computers that can:

(1) execute Java programs;
(2) create a TCP connection to every other computer in the sample embodiment; and
(3) use JDBC to connect to one or more of the databases in the sample embodiment.

Every database in the sample embodiment is connected to at least one computer in the sample embodiment.

Communications Mechanism

The programs making up the sample embodiment communicate over TCP streams.

Transactions

Each transaction in the sample embodiment is implemented by a Java method. The methods use JDBC to manipulate a database. Each method takes its transaction stimulus as an argument. The transaction stimulus is encoded as an XML document in text form. The method parses the document and then executes the transaction, using the document's fields as arguments to the transaction. A program called the "execution program," described below, contains all the transaction methods.

Each transaction is assigned a different integer as an identifier. The integer is called the "transaction ID." There is a one to one mapping between transaction IDs and the Java methods which implement transactions. A transaction stimulus contains the transaction ID of its transaction; the execution program uses this mapping to choose the method for executing the transaction specified by a transaction stimulus message.

Messages

Messages in the sample embodiment are rows in a database. A database contains a separate table for each message type it can contain. Each row in one of these tables is a message. The fields of a message correspond to the table's columns. Message tables are ordinary tables in the database. The Java methods which implement transactions read and write these rows in the same way they read and write any other rows in the database.

Message tables differ from other tables in a database in that, by convention, every message table contains a column containing a value uniquely identifying the extended transaction to which the message belongs.

Transaction stimuli messages are contained in database tables as are other messages. These tables differ from other message tables in that all tables containing transaction stimuli have, by convention, two columns in common in addition to the column shared by all messages:

(1) the transaction ID. Every row in a given table is a transaction stimulus for the same transaction so all the rows in a given table have the same value in this column.
(2) the database ID of the database on which this transaction stimulus is to be executed. It is the responsibility of the application programmer to determine the database on which the transaction stimulus is to execute and to set this field properly.

The Communicating Transaction Framework (CTF)

The Communicating Transaction Framework (CTF) in the sample embodiment is a distributed program. Two processes are connected to each database in an instance of the sample embodiment. The processes exchange transaction stimulus messages over TCP streams. All the processes work together to implement the CTF.

The sample embodiment builds the CTF in three steps: (1) pull the transaction stimuli messages out of the databases; (2) transfer each transaction stimulus to a process connected to the database on which it should execute; and (3) execute the transferred transaction stimuli.

Figure 7A:
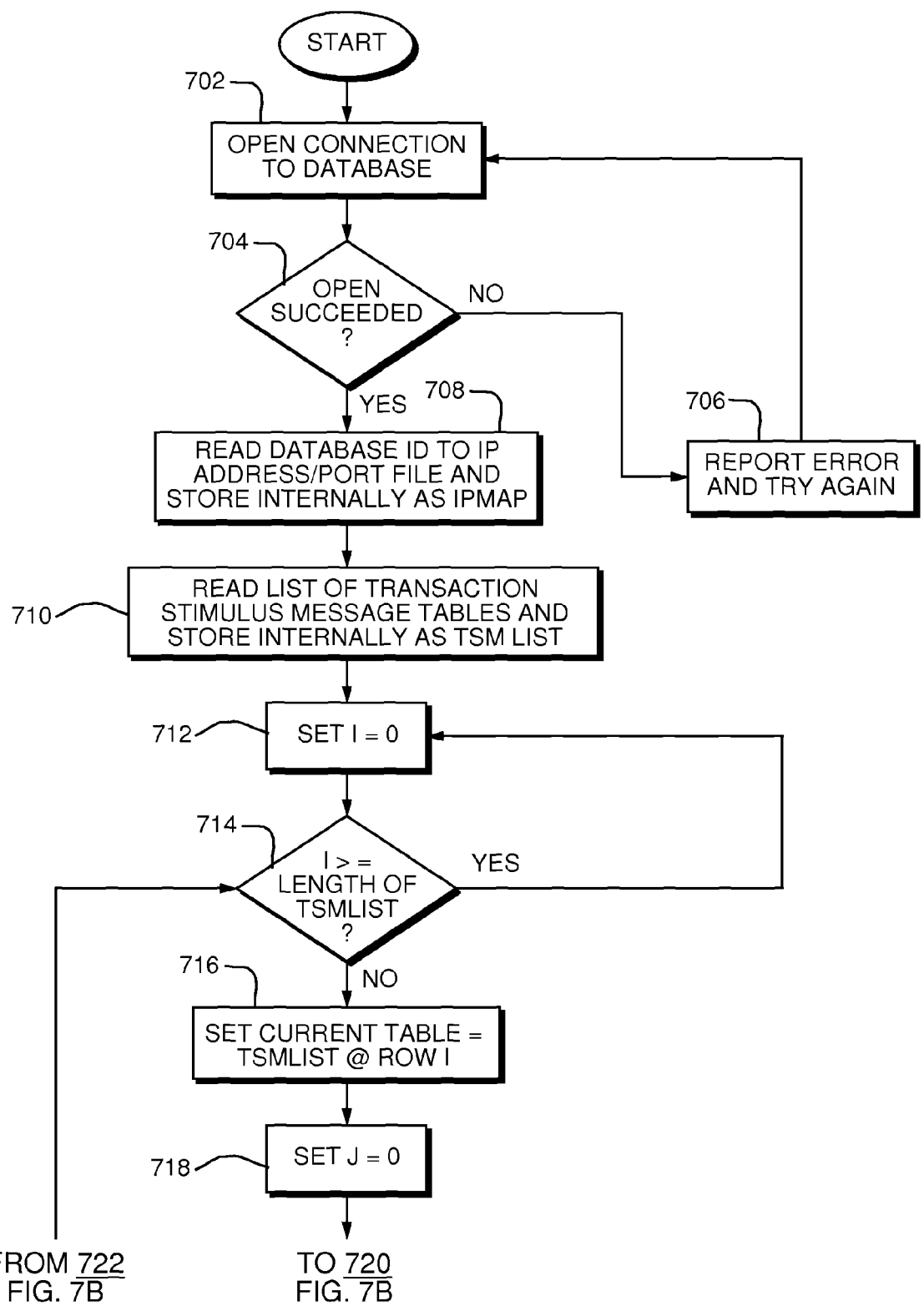
FIG. 7 is a flowchart of a polling program used in a sample implementation of the present invention.
Figure 7B:
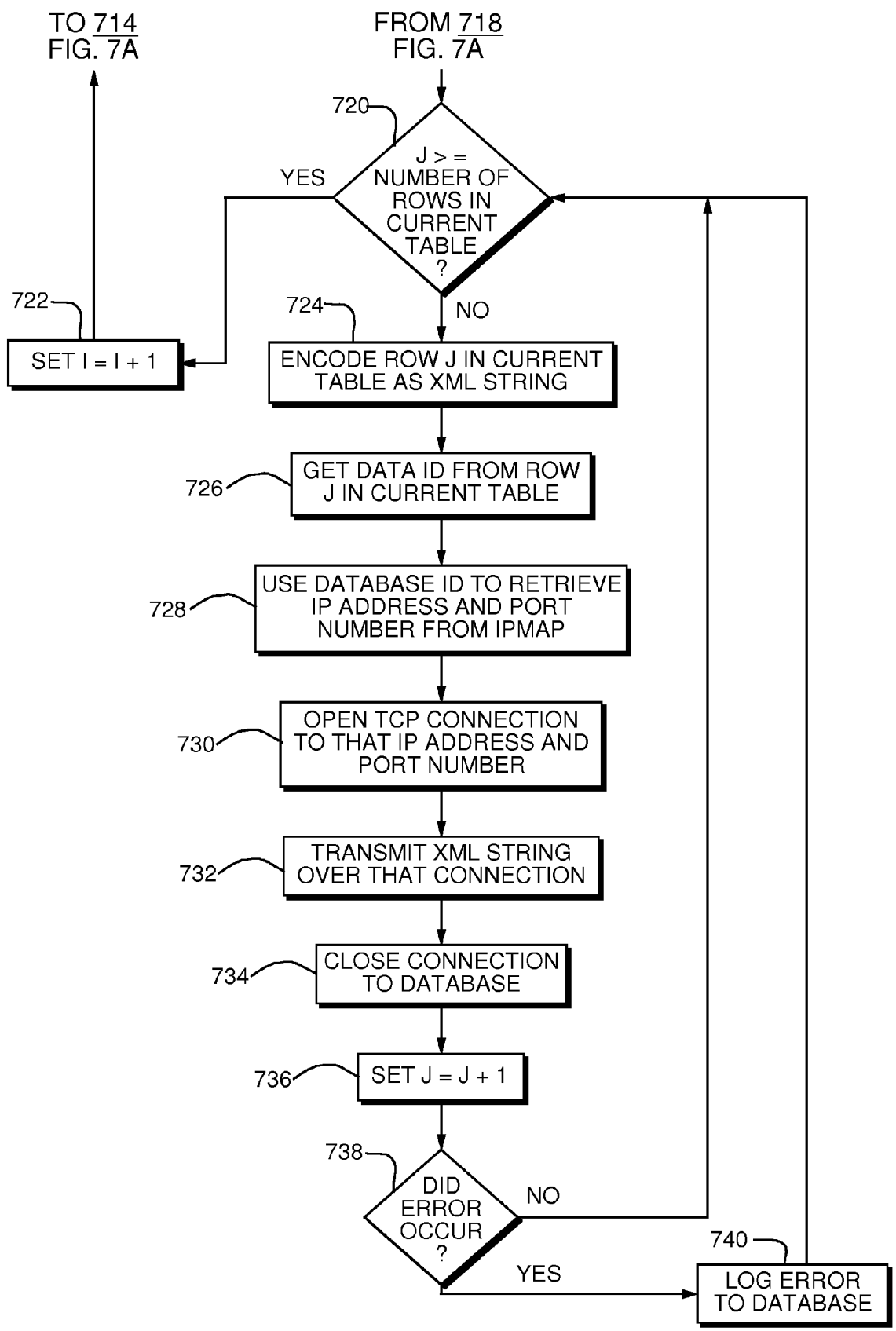
Figure 8A:
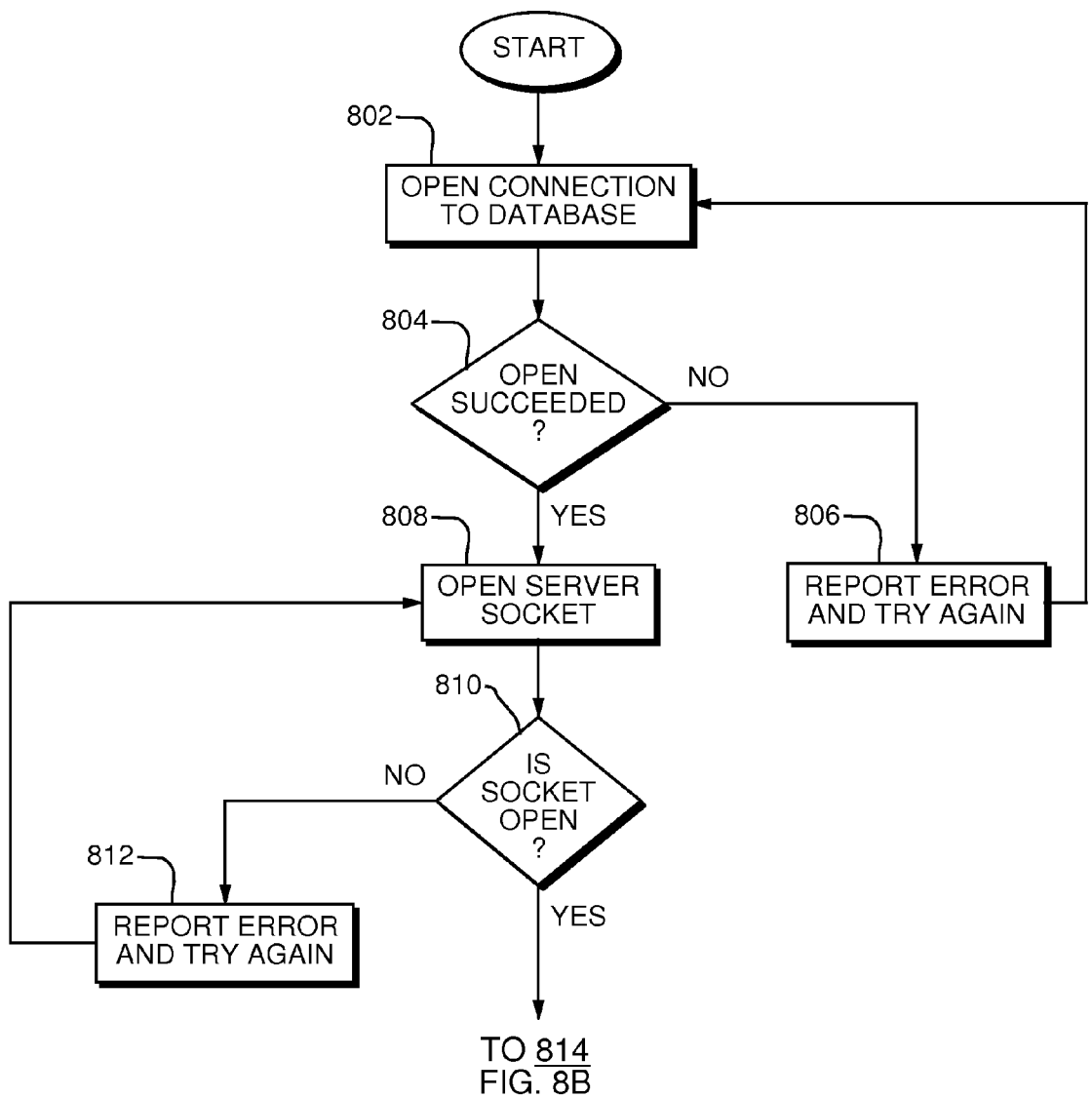
FIG. 8 is a flowchart of an execution program used in the sample implementation of the present invention.
Figure 8B:
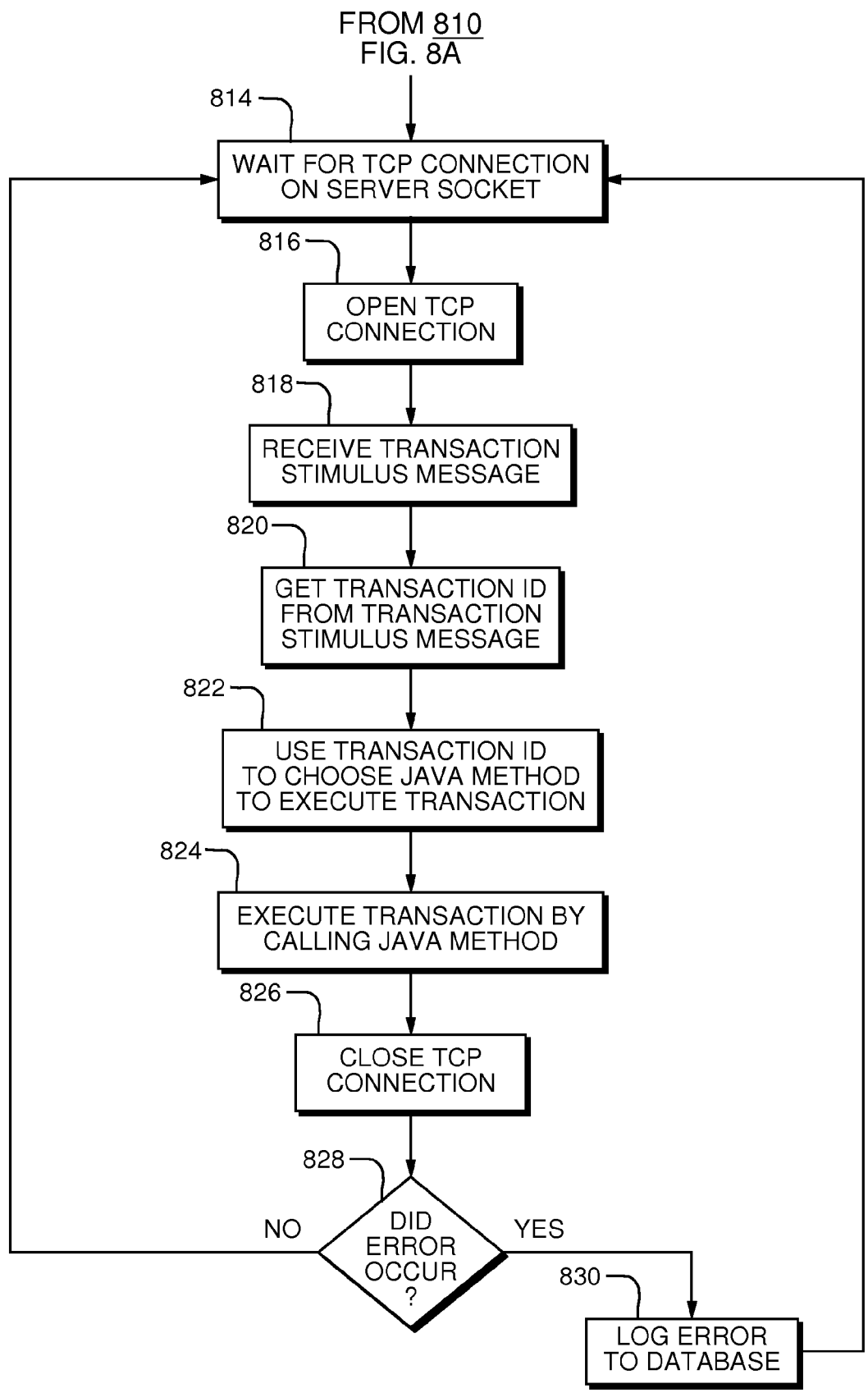

The sample embodiment includes two Java programs. The first is called a "polling program" and performs the first step mentioned above; it reads the transaction stimuli messages from a database. The second program is called the "execution program" and performs the third step; it executes the transaction stimuli. See FIG. 7 for a flowchart of one embodiment 700 of the polling program. See FIG. 8 for a flowchart of one embodiment 800 of the execution program.

Every database in the sample embodiment is connected to two operating system processes. These processes are ordinary operating system processes running on a computer which can connect to that database and which fulfills the other requirements of computers used by the sample implementation. One of these processes runs the polling program and the other runs the execution program.

An instance of a polling program cooperates with an instance of an execution program to perform the second step. For each transaction stimulus message a polling program instance reads from a database, the polling program encodes that message as an XML document represented as text, opens a TCP connection to an execution program instance, and transmits the XML document over the connection. The execution program instance receives the XML document, parses it, and then executes the Java code which implements that transaction with parameters taken from the XML document.

Every database in the sample implementation is attached to one instance of the polling program and to one instance of the execution program. Each instance of a polling program is connected to one database and each instance of an execution program is connected to one database. These program instances can run on any computer from which they can attach to their database.

Each instance of the execution program is assigned a port number. Each instance listens for TCP connections at its computer's IP address and at its port number. The IP address/ port number pair uniquely identifies an execution program instance. As we mentioned above, each database has a unique integer ID. We may therefore associate a database's unique ID with the IP address and port number pair of the execution program attached to it. The association is contained in a file which is passed to a polling program instance as a startup parameter.

When a polling program begins execution it reads the file which maps database IDs to IP address/port number pairs. The polling program stores this mapping in an internal data structure. As mentioned above, every row in a database table which contains a transaction stimulus message includes a field containing the database ID for the database on which to execute the transaction stimulus. A polling program instance uses this field to look up the IP address and port number of the execution program instance attached to that database. It then opens a TCP connection to that IP address and port number, encodes the transaction stimulus as an XML document in text form, writes the XML document over the TCP connection, and then closes the TCP connection.

Each transaction defined in the sample implementation is implemented by a java method using JDBC. All these Java methods are included in the execution program. Each of these methods includes code that parses the XML representation of the transaction stimulus for that transaction. When the Java method is called with an XML representation of its transaction stimulus, it parses the XML document and executes the transaction with parameters taken from the transaction stimulus.

Each transaction defined in the sample embodiment has a unique integer as its identifier. Each row in a database table containing a transaction stimulus message includes a field containing that ID. When a polling program encodes a transaction stimulus as an XML document in the sample embodiment, the value of the transaction field is always included as the value of a particular tag. Therefore, when an execution program instance receives that XML document, it can retrieve the transaction ID from the XML document without any knowledge of the meaning of the other tags in the document.

An execution program contains a mapping from transaction type IDs to the Java methods which implement that transaction. When an execution program receives an XML document encoding a transaction stimulus, it finds the transaction type ID in the document, uses it to determine the method which executes that transaction, and calls that method with the XML document as its argument. As a result, the transaction stimulus is executed.

In the sample embodiment, there is an operating system specific mechanism which will start every instance of an execution program on its proper computer and which will restart a failed instance of an execution program. This operating system mechanism passes two sets of parameters to each execution program instance it starts: the IP address and port number at which the instance will listen for connections, and whatever information is necessary for the instance to connect to its database.

Each database may include tables containing transaction stimuli messages. For each database, a file exists which contains the names of all the tables within the database that contain transaction stimuli messages. Call this file the database's "transaction table file." Recall that there exists a file associating each database ID with the IP address and port number of the execution program attached to it. Call this second file the "execution address file."

In the sample embodiment, there is an operating system specific mechanism which will start every instance of a polling program on its proper computer and which will restart a failed instance of an polling program. Furthermore, in the sample embodiment, every computer which runs a polling program contains a readable copy of the execution address file and a readable copy of the transaction table file for the polling program instance's database. The operating system passes three sorts of parameters to each polling program it starts: the information the instance needs to connect to its database, the pathname of the execution address file, and the pathname of the transaction table file for the instances database.

When an execution program instance begins execution, it opens a JDBC connection to its database (FIG. 8, step 802), using the parameters passed to it by the operating system. If the open fails (step 804), the instance sleeps for some time and tries again (step 806). The program repeats this process until it opens a connection. The instance then opens a server socket listening for connections at the IP address and port number passed to it by the operating system (step 808). Again, if the open fails (step 810), the instance sleeps for a time and tries again until the open succeeds (step 812). The execution program then runs as an endless loop. It listens for a TCP connection on its server socket (step 814), accepts the connection (step 816), reads a transaction stimulus as an XML document (step 818), takes the transaction ID out of the XML document (step 820), and calls the method identified by the transaction ID (steps 822-824). Then the instance closes the TCP connection (step 826) and waits for a new connection. If an error occurs (step 828), the execution program logs the error (step 830) before waiting for the new connection.

When a polling program instance begins execution, it opens a JDBC connection to its database (FIG. 7, step 702), using the parameters passed to it by the operating system. If the open fails (step 704), the instance sleeps for some time and tries again (step 706). The program repeats this process until it opens a connection. The instance then reads the execution address file whose pathname was passed to it by the operating system and stores the database ID to IP address/port number mapping in an internal data structure (step 708). It then reads the transaction table file whose pathname was passed to it by the operating system and stores the table names in an internal data structure (step 710). The polling program then runs as an endless loop (initialized at step 712). Within this loop the polling program iterates through every database table named in the transaction table file (step 714). For each table, it reads all the rows of the table (controlled by steps 716-722 and 736). For each row, it encodes the row as an XML document in text form (step 724), looks up the IP address/port number for the database id contained in the row (steps 726-728), opens a TCP connection to that IP address/port number (step 730), transmits the XML document (step 732) over the connection and then closes the connection (step 734). If an error occurs (step 738) the error is logged (step 740).

Note that it is not difficult to change the method executed in response to a transaction stimulus message. To do so, an implementer rewrites the method and creates a new version of the execution program. An administrator stops the running execution program, and starts the new version in its place.

When a polling or execution program fails to connect to its database or to open a socket, the program reports the error to an administrator. The administrator may correct the cause of the failure and, if necessary, restart the program.

Suppose an error takes place within a transaction and the transaction cannot recover. For example, suppose transaction code throws an exception which is not caught within the code. Then the CTF may catch the error and log the error in its database. The error message may be considered to be a state message belonging to the extended transaction of which the component transaction was a part, even though it was written by the CTF. Failed transactions may be detected by, for example, a SQL SELECT statement which reads error messages. An administrator or a program may handle the failed transactions. If a component transaction fails repeatedly, an administrator may notice the failures and arrange to have the code implementing the transaction rewritten in a new execution program.

When the CTF writes an error message, writing the error message may not take place within the transaction's atomicity guarantees. As a result, the message may be lost. Presumably though, the failed transaction will be retried. If it fails again the CTF may try to write the error message a second time. Eventually, either the error will be written or an administrator will notice that the CTF cannot access its database. In the second case, the administrator will fix the problem and a retry of the transaction will cause another failure which will cause the CTF to write the error message to the database.

Figure 9:
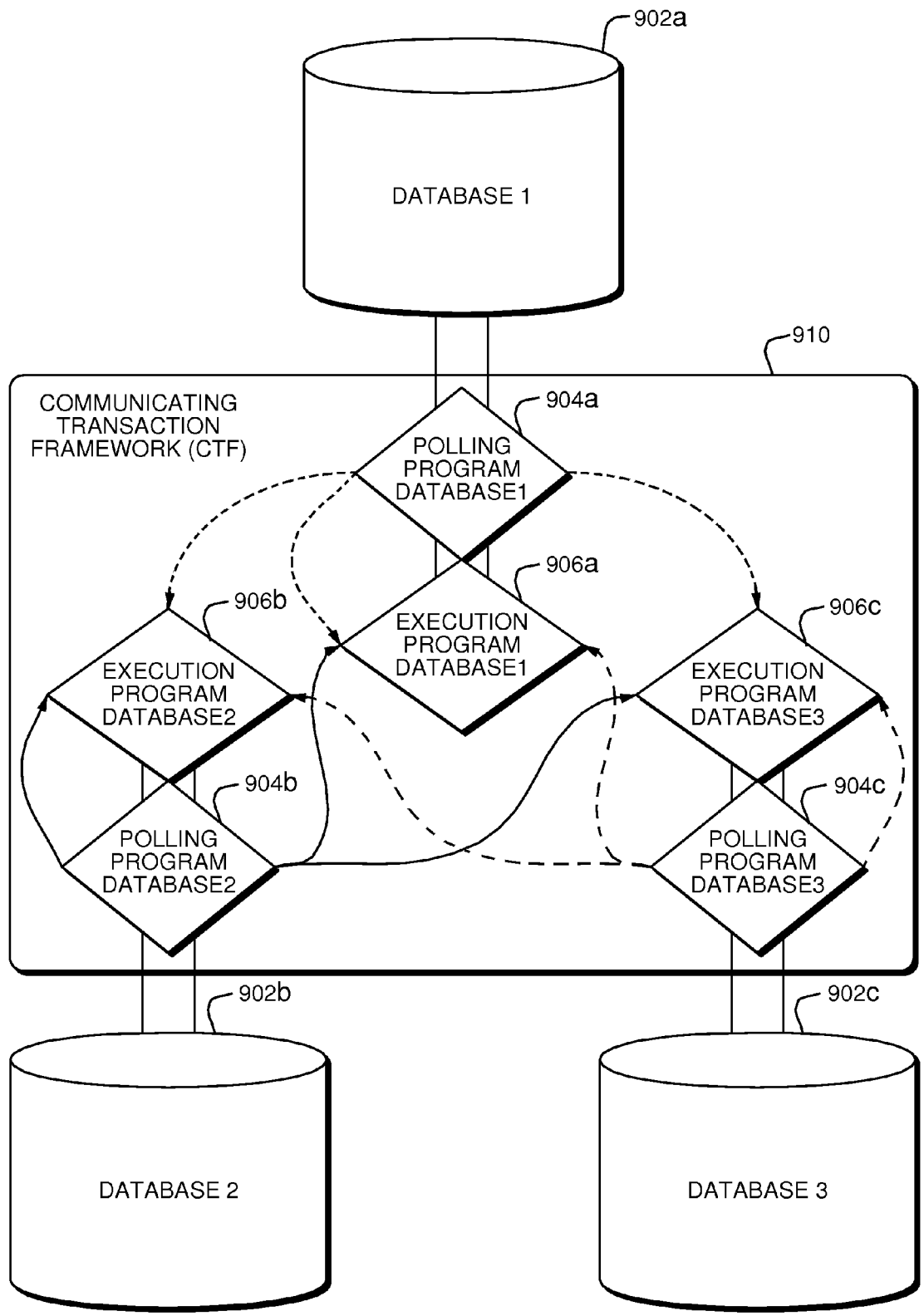
FIG. 9 is a diagram of an instance of the sample implementation of the present invention including three databases.

The set of all polling and execution programs forms the CTF. See FIG. 9 for a representation of a sample embodiment including a CTF 910 and three databases 902*a-c*. In the embodiment illustrated in FIG. 9, CTF 910 includes polling programs 904*a-c* for databases 902*a-c*, respectively, and execution programs 906*a-c* for databases 902*a-c*, respectively. In the sample embodiment, the CTF 910 guarantees that no two component transactions belonging to the same extended transaction execute simultaneously over the same database by executing only one component transaction at a time. A CTF which executed component transactions in parallel could impose the same guarantee by, for example, ensuring that the different component transactions were from different extended transactions.

Each polling program instance may attempt to transmit each transaction stimulus message in its database again and again for as long as the sample embodiment executes. Each execution program instance attempts to execute every transaction stimulus message it receives. If we assume that any given transaction stimulus message executes after a finite number of attempts at transmission and execution, then the sample embodiment guarantees the eventual execution of every transaction stimulus message in its database. The sample implementation may try to execute a transaction stimulus message even if the transaction stimulus message has already been successfully executed.

Embodiments of the present invention have a variety of advantages. For example, embodiments of the present invention may be used to implement transactions that are long-lived. In fact, there is no limitation on the duration of the execution of any component transaction or extended transaction implemented according to embodiments of the present invention. This contrasts with conventional techniques for combining multiple transactions into a single transaction. Such techniques typically use component transactions which hold locks on state shared by the component transactions. As a result, each component transaction holding a lock needs to execute quickly to avoid dominating access to the locked state for too long. In contrast, embodiments of the present invention do not require component transactions to use locks. As a result, embodiments of the present invention may be used to implement long-lived transactions, such as those which occur over minutes, hours, days, months, or years.

Furthermore, embodiments of the invention require no changes to be made in the functioning of component transactions. Component transactions implemented according to embodiments of the present invention may, for example, execute in exactly the same way as a component transaction which is not part of an extended transaction. Furthermore, in embodiments of the present invention, local databases may hold all of an extended transaction's state. Embodiments of the present invention need not maintain any global state between databases or between component transactions. As a result, embodiments of the present invention may be implemented more simply and reliably than systems implementing two phase commit.

Embodiments of the present invention may operate in extremely heterogeneous environments. Transactions implemented by embodiments of the present invention may, for example, execute over databases of different types and different implementations which are connected to different types of computers running different operating systems, contained in different administrative domains, and connected by different communications mechanisms. Embodiments of the present invention, therefore, are ideally suited for use in a modern distributed environment, such as the World Wide Web. As a result, embodiments of the present invention may advantageously be implemented within a wide variety of existing systems without requiring substantial changes to be made to such systems.

Because embodiments of the present invention do not require a global state, a transaction may survive even when its component databases are temporarily isolated. For the same reason, transactions may be retried an arbitrary number of times over an arbitrary period. In other words, survivability is built into the design of embodiments of the present invention.

Furthermore, there is no intrinsic limit to the number of extended transactions which may be in process at any one time, or to the number of databases which may be part of an embodiment of the invention.

Furthermore, embodiments of the present invention allow control over the order in which component transactions are executed.

In addition, embodiments of the present invention allow an administrator to examine and change transaction state. Similarly, a transaction's state is completely described by the contents of the databases over it executes and can therefore be determined by the querying tools native to the database. Because a transaction's state is completely described by the contents of the database over which it executes, the transaction's state may be saved, copied, and restored by the mechanisms normally used to save, copy, and restore the database's contents. This simplifies implementation of such functions on transactions.

Embodiments of the present invention also allow new component transactions to be added to an embodiment, and allow the behavior of existing components to be changed.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Certain references herein to "transactions" may refer to specific instances of transactions. For example, certain references herein to "multiple" transactions may refer to multiple instances of a single transaction. Those having ordinary skill in the art will understand the meaning of such references to "transactions" herein.

Although certain examples described herein may make reference to "distributed transactions," transactions used in embodiments of the present invention need not be distributed. For example, some or all of the component transactions that comprise an extended transaction may execute over a single, non-distributed, database. In such a case, the extended transaction is not a distributed transaction. As a result, any reference herein to "local" transactions within an extended transaction does not imply that other transactions within the extended transaction need be "non-local" or "remote." Rather, the term "local transaction" is used synonymously herein with "component transaction" to mean any transaction which forms part of an extended transaction.

Furthermore, although certain examples described herein may make reference to "long-lived" transactions, transactions used in embodiments of the present invention need not be long-lived. Rather, both component transactions and extended transactions implemented according to embodiments of the present invention may be executed over any period of time. Furthermore, any amount of time may pass between execution of component transactions in an extended transaction implemented according to embodiments of the present invention.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A system comprising:
   a database system comprising:
      a first database tangibly stored in at least a first computer-readable medium;

first atomic transaction means for using a first processor communicatively coupled to a first memory to execute a first component transaction instance atomically on the first database, the first atomic transaction means comprising:
  first operation execution means to perform a first operation and thereby to produce first application data within an atomicity guarantee of the first component transaction instance;
  first application data storage means for storing the first application data in a first record of the first database within the atomicity guarantee of the first component transaction instance;
  first state storage means for storing a first state of a computation, based on the first operation, in a second record of the first database within the atomicity guarantee of the first component transaction instance;
  transaction stimulus message generation means for storing a transaction stimulus message in a fifth record of the first database within the atomicity guarantee of the first component transaction instance;
a second database tangibly stored in at least a second computer-readable medium;
second atomic transaction means for using a second processor communicatively coupled to a second memory to execute a second component transaction instance atomically on the second database, the second atomic transaction means comprising:
  means for reading the first state of the computation from the second record of the first database;
  second operation execution means to perform a second operation, in response to the first state, to produce second application data within an atomicity guarantee of the second component transaction instance;
  second application data storage means for storing the second application data in a third record of the second database within the atomicity guarantee of the second component transaction instance;
  second state storage means for storing a second state of the computation, based on the second operation, in a fourth record of the second database within the atomicity guarantee of the second component transaction instance; and
wherein the system further comprises:
transaction stimulus reception means for receiving the transaction stimulus message by reading the fifth record from the first database; and
transaction stimulus message execution means for causing, in response to reading the fifth record, the second atomic transaction means to execute the second component transaction instance.

2. The system of claim 1, wherein the first and second databases are the same database.

3. The system of claim 1, wherein the second record and the fourth records are the same records.

4. The system of claim 1, wherein the first and second databases are of different types.

5. The system of claim 1, wherein the transaction stimulus reception means is external to the database system.

6. The method of claim 1, wherein the transaction stimulus reception means comprises means for receiving the transaction stimulus message over the Internet.

7. The system of claim 6, wherein the transaction stimulus reception means comprises means for receiving the transaction stimulus message in an email message.

8. The method of claim 1, wherein the transaction stimulus message specifies the second operation.

9. A computer-implemented method for use with a database system, the method performed by a processor executing computer program instructions tangibly embodied in a first computer-readable storage medium, the database system comprising first database and second database tangibly stored in at least one second computer-readable storage medium, the method comprising
  (A) executing a first component transaction instance atomically on the first database, comprising
    (1) performing a first operation and produce first application data within an atomicity guarantee of the first component transaction instance;
    (2) storing the first application data in a first record of the first database within the atomicity guarantee of the first component transaction instance; and
    (3) storing a first state of a computation, based on the first operation, in a second record of the first database within the atomicity guarantee of the first component transaction instance;
    (4) storing a transaction stimulus message in a fifth record of the first database within an atomicity guarantee of the first component transaction instance;
  (B) executing a second component transaction instance atomically on the second database, comprising:
    (1) reading the first state of the computation from the second record of the first database;
    (2) performing a second operation, in response to the first state, to produce second application data within an atomicity guarantee of the second component transaction instance;
    (3) storing the second application data in a third record of the second database within the atomicity guarantee of the second component transaction instance;
    (4) storing a second state of the computation, based on the second operation, in a fourth record of the second database within the atomicity guarantee of the second component transaction instance;
  (C) receiving the transaction stimulus message by reading the fifth record from the first database; and
  (D) performing (B) in response to receiving the transaction stimulus message.

10. The method of claim 9, wherein the first and second databases are the same database.

11. The method of claim 9, wherein the second and fourth records are the same record.

12. The system of claim 9, wherein the transaction stimulus message generation means comprises means for storing the transaction stimulus message to control an order in which a plurality of other transaction instances execute.

13. The system of claim 9, wherein the transaction stimulus message generation means comprises means for writing the transaction stimulus message to control whether another transaction instance is permitted to update a field in a database.

14. The system of claim 9, wherein the means for reading comprises means for reading the first state an arbitrary amount of time after the first state storage means stores the first state in the second record of the first database.

15. The method of claim 9, wherein (A)(4) comprises storing the transaction stimulus message to control an order in which a plurality of other transaction instances execute.

16. The method of claim 9, wherein (A)(4) comprises writing storing the transaction stimulus message to control whether another transaction instance is permitted to update a field in a database.

17. The method of claim 9, wherein (B)(1) comprises reading the first state an arbitrary amount of time after (A)(3).

18. The system of claim 9, wherein the fifth record is the same as the second record.

19. The system of claim 9, wherein the transaction stimulus message generation means comprises:
   means for attempting to write, into a plurality of fields having a plurality of original values in a plurality of databases, a plurality of new values; and
   means for returning the plurality of fields to the plurality of original values if the attempt fails with respect to at least one of the plurality of fields.

20. The method of claim 9, wherein (C) comprises reading the first record from the first database using a transaction stimulus reception means, wherein the transaction stimulus reception means is external to the database system.

21. The method of claim 9, wherein the fifth record is the same as the second record.

22. The method of claim 9, wherein (A)(4) comprises:
   attempting to write, into a plurality of fields having a plurality of original values in a plurality of databases, a plurality of new values; and
   returning the plurality of fields to the plurality of original values if the attempt fails with respect to at least one of the plurality of fields.

* * * * *

UNITED STATES PATENT AND TRADEMARK OFFICE
CERTIFICATE OF CORRECTION

| | |
|---|---|
| PATENT NO. | : 7,840,525 B2 |
| APPLICATION NO. | : 11/870497 |
| DATED | : November 23, 2010 |
| INVENTOR(S) | : Jonathan P. Ruby |

It is certified that error appears in the above-identified patent and that said Letters Patent is hereby corrected as shown below:

On Title page, in Item (60), in "Related U.S. Application Data", in column 1, line 1-2, delete "Oct. 11, 2007." and insert -- Oct. 11, 2006. --, therefor.

In column 1, line 7, delete "Oct. 11, 2007," and insert -- Oct. 11, 2006, --, therefor.

In column 6, line 64, delete "10b" and insert -- 110b --, therefor.

In column 13, line 27, after "messages" insert -- . --.

In column 17, line 44, delete "id" and insert -- ID --, therefor.

In column 21, line 7, in claim 1, after "operation" delete "and thereby".

In column 22, line 9, in claim 9, after "comprising" insert -- : --.

In column 22, line 11, in claim 9, after "comprising" insert -- : --.

In column 22, line 12, in claim 9, delete "and" insert -- to --, therefor.

In column 22, line 48, in claim 12, delete "claim 9," and insert -- claim 1, --, therefor In column 22, line 52, in claim 13, delete "claim 9," and insert -- claim 1, --, therefor.

In column 22, line 57, in claim 14, delete "claim 9," and insert -- claim 1, --, therefor.

In column 22, line 65, in claim 16, before "storing" delete "writing".

In column 23, line 3, in claim 18, delete "claim 9," and insert -- claim 1, --, therefor.

Signed and Sealed this
First Day of February, 2011

David J. Kappos
*Director of the United States Patent and Trademark Office*

In column 23, line 5, in claim 19, delete "claim 9," and insert -- claim 1, --, therefor.